(12) United States Patent
Zhang et al.

(10) Patent No.: US 12,262,228 B2
(45) Date of Patent: Mar. 25, 2025

(54) COMMUNICATION METHOD AND APPARATUS

(71) Applicant: HUAWEI TECHNOLOGIES CO., LTD., Guangdong (CN)

(72) Inventors: Hongping Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 455 days.

(21) Appl. No.: 17/848,852

(22) Filed: Jun. 24, 2022

(65) Prior Publication Data
US 2022/0322111 A1    Oct. 6, 2022

Related U.S. Application Data

(63) Continuation of application No. PCT/CN2020/094777, filed on Jun. 5, 2020.

(30) Foreign Application Priority Data

Dec. 25, 2019    (WO) ............... PCT/CN2019/128484

(51) Int. Cl.
*H04W 24/02*    (2009.01)
*H04L 41/16*    (2022.01)
*H04W 48/10*    (2009.01)

(52) U.S. Cl.
CPC ............. *H04W 24/02* (2013.01); *H04L 41/16* (2013.01); *H04W 48/10* (2013.01)

(58) Field of Classification Search
CPC ..... H04W 48/10; H04W 24/02; H04W 80/08; H04L 41/16; G06N 20/00
See application file for complete search history.

(56) References Cited

U.S. PATENT DOCUMENTS

| | | |
|---|---|---|
| 10,039,016 B1 | 7/2018 | Larish et al. |
| 2017/0353991 A1 | 12/2017 | Tapia |
| 2018/0246883 A1* | 8/2018 | Wang .................. G06F 17/18 |

(Continued)

FOREIGN PATENT DOCUMENTS

| | | |
|---|---|---|
| CN | 107808007 A | 3/2018 |
| CN | 108307516 A | 7/2018 |

(Continued)

OTHER PUBLICATIONS

O-RAN Alliance, "O-RAN: Towards an Open and Smart RAN," O-RAN Alliance White Paper, Oct. 2018, 19 pages.

(Continued)

*Primary Examiner* — Brian D Nguyen
(74) *Attorney, Agent, or Firm* — Fish & Richardson P.C.

(57) ABSTRACT

An artificial intelligence (AI) protocol layer of a first access network device generates an AI parameter, and sends the AI parameter to a terminal device. Then, the first access network device receives, from the terminal device, AI data obtained based on the AI parameter. The AI protocol layer of the first access network device is an upper layer of a radio resource control (RRC) protocol layer of the first access network device, an AI protocol layer of the terminal device is an upper layer of an RRC protocol layer of the terminal device, and the AI parameter indicates the AI data that needs to be obtained and an AI data obtaining manner.

20 Claims, 9 Drawing Sheets

(56) References Cited

U.S. PATENT DOCUMENTS

| | | | |
|---|---|---|---|
| 2019/0141580 A1 | 5/2019 | Oktay et al. | |
| 2019/0236598 A1* | 8/2019 | Padmanabhan | G06Q 20/389 |
| 2020/0160458 A1* | 5/2020 | Bodin | G06F 40/30 |
| 2020/0229021 A1* | 7/2020 | Zheng | H04W 76/12 |
| 2020/0252789 A1* | 8/2020 | Zheng | H04L 67/568 |
| 2021/0044955 A1* | 2/2021 | Lu | G06F 16/9535 |
| 2021/0136095 A1* | 5/2021 | Dinh | G06N 5/01 |
| 2024/0121328 A1* | 4/2024 | Wei | H04L 49/3072 |

FOREIGN PATENT DOCUMENTS

| | | |
|---|---|---|
| CN | 109688597 A | 4/2019 |
| CN | 110603854 A | 12/2019 |
| WO | 2018127107 A1 | 7/2018 |
| WO | 2019180700 A1 | 9/2019 |

OTHER PUBLICATIONS

O-RAN Alliance, "LS on O-RAN Alliance and 3GPP Coordination on O-RAN Alliance Outputs," 3GPP TSG-SA3 Meeting #97, S3-193932, Reno, US, Nov. 18-22, 2019, 3 pages.

Fujitsu Limited, "Fujitsu Views on Rel-17 RAN Enhancements," 3GPP TSG RAN Meeting #84, RP-190955, Newport Beach, USA, Jun. 3-6, 2019, 18 pages.

CMCC, "Motivation for Study on RAN-Centric Data Collection and Utilization Enhancement," 3GPP TSG RAN Meeting #85, RP-191785, Newport Beach, USA, Sep. 16-20, 2019, 8 pages.

Extended European Search Report in European Appln No. 20904404.9, dated Jan. 2, 2023, 7 pages.

EP Communication Pursuant to Article 94(3) EPC in European Appln No. 20904404.9, dated Mar. 30, 2023, 6 pages.

3GPP TS 36.331 V15.7.0 (Sep. 2019), "3rd Generation Partnership Project; Technical Specification Group Radio Access Network; Evolved Universal Terrestrial Radio Access (E-UTRA); Radio Resource Control (RRC); Protocol specification (Release 15)," Sep. 2019, 962 pages.

Nokia et al., "IAB Node Integration Option 2a," 3GPP TSG-RAN WG3#101bis, R3-185696, Chengdu, China, Oct. 8-12, 2018, 6 pages.

PCT International Search Report and Written Opinion issued in International Application No. PCT/CN2020/094777 on Sep. 28, 2020, 15 pages (with English translation).

PCT International Search Report and Written Opinion issued in International Application No. PCT/CN2019/128484 on Sep. 15, 2020, 17 pages (with English translation).

\* cited by examiner

COMMUNICATION METHOD AND APPARATUS

CROSS-REFERENCE TO RELATED APPLICATIONS

This application is a continuation of International Application No. PCT/CN2020/094777, filed on Jun. 5, 2020, which claims priority to Chinese Patent Application No. PCT/CN2019/128484, filed on Dec. 25, 2019. The disclosures of the aforementioned applications are hereby incorporated by reference in their entireties.

TECHNICAL FIELD

This application relates to the communication field, and in particular, to a communication method and apparatus.

BACKGROUND

To improve management efficiency of an increasingly complex wireless network, an artificial intelligence (AI) technology may be introduced into a radio access network (RAN), to implement RAN intelligence. For example, the AI technology is used to implement continuous and dynamic self-optimization of the RAN based on different time points, locations, and services.

Currently, a base station sends a minimization of drive tests (minimization drive test, MDT) parameter to a commercial terminal by using an RRC message, and receives an MDT report of the commercial terminal by using another RRC message, to implement self-optimization or self-organized management of the RAN. However, the MDT parameter is configured for an MDT requirement, and data in the MDT report is also data for the MDT requirement. As a result, obtaining data in a manner similar to MDT is limited by an existing RRC protocol layer procedure. Consequently, an AI parameter cannot be flexibly configured and cannot meet various types of requirements of AI training, a quantity of obtained AI data is insufficient, and a type of the obtained AI data is limited. This causes accuracy and efficiency of the AI training to be low. In addition, when an AI function needs to be adjusted, for example, when a new AI function is introduced, the existing RRC protocol layer procedure needs to be modified, which has great impact on an existing protocol and has a great technical difficulty. Consequently, development costs and deployment costs remain high.

SUMMARY

Embodiments of this application provide a communication method and apparatus, to resolve a problem that flexibility of an AI function is poor because the AI function is bound to an existing RRC protocol layer procedure.

To achieve the foregoing objective, the following technical solutions are used in this application.

According to a first aspect, a communication method is provided. The communication method includes: An artificial intelligence (AI) protocol layer of a first access network device generates an AI parameter. The AI protocol layer of the first access network device is an upper layer of a radio link control (RRC) protocol layer of the first access network device. Then, the first access network device sends the AI parameter to a terminal device. The AI parameter is used to indicate AI data that needs to be obtained and an AI data obtaining manner. Then, the first access network device receives the AI data from the terminal device.

Based on the communication method provided in the first aspect, an independent AI protocol layer is introduced above the RRC protocol layer of the first access network device, so that a type of an AI function and a quantity of AI functions supported by the first access network device can be flexibly adjusted based on an actual requirement of AI training, for example, a new AI function is introduced, or an original AI function is modified, deleted, or recombined, and a communication function of the first access network device can be separated from the AI function of the first access network device. For example, the AI functions such as generating the AI parameter, receiving and parsing the AI data reported by the terminal device, and completing a network optimization operation based on the AI data are completed by the AI protocol layer of the first access network device. However, an original protocol layer of the first access network device, for example, the RRC protocol layer, only needs to implement the communication function, and does not need to perform an AI function-related operation. In this way, a problem that the AI function is bound to an existing RRC protocol layer procedure because the AI function is completed through the existing RRC protocol layer procedure such as minimization of drive tests can be resolved, to improve diversity and flexibility of the AI function supported by the first access network device, and improve accuracy and efficiency of the AI training. In addition, the original protocol layer does not need to be modified, an existing protocol is not affected, and a technical difficulty in implementing the AI function is low, to effectively reduce device development costs and network deployment costs.

In addition, the AI parameter is determined based on the requirement of the AI training. Therefore, the AI data obtained based on the AI parameter can meet various actual requirements of the AI training on a data type, a quantity of data, a data source, and the like, and problems such as a limited type of the data, an insufficient quantity of the data, and a failure to select the data source that are caused by completing the AI function through the existing RRC protocol layer procedure can be resolved, to further improve the accuracy and the efficiency of the AI training.

In a possible design method, after that an artificial intelligence (AI) protocol layer of a first access network device generates an AI parameter, the communication method provided in the first aspect may further include: The AI protocol layer of the first access network device encapsulates the AI parameter into a first AI protocol data unit (AI PDU), and the AI protocol layer of the first access network device sends the first AI PDU to the RRC protocol layer of the first access network device. Then, the RRC protocol layer of the first access network device may add encapsulation information of the RRC protocol layer to the first AI PDU and send the first AI PDU. In this way, the AI protocol layer of the first access network device can be separated from the existing protocol layer of the first access network device, so that the flexibility of the AI function supported by the first access network device can be improved. In addition, the existing protocol layer does not need to perform the AI-related operation, so that impact of the AI function on the communication function can be reduced, and technical complexity of the first access network device can be reduced, to reduce the development costs and the deployment costs of the first access network device.

In a possible design method, the AI parameter may include a first AI parameter. The first AI parameter is sent by using a broadcast AI system information block (SIB). Because the first AI parameter does not limit a terminal device that reports the AI data, the first access network device may complete the AI training based on statistical results of AI data reported by a plurality of terminal devices, to improve the accuracy and the efficiency of the AI training.

Further, the AI parameter may further include a second AI parameter. The second AI parameter is sent by using RRC dedicated signaling, and a priority of the second AI parameter is higher than a priority of the first AI parameter. Because the second AI parameter limits a terminal device that reports the AI data, for example, limits a type and a service type of the terminal device, and is more targeted than the first AI parameter, the priority of the second AI parameter is higher than the priority of the first AI parameter, that is, the terminal device preferentially uses the second AI parameter to obtain and report the AI data. This can further improve the accuracy and the efficiency of the AI training.

Optionally, the RRC dedicated signaling may be sent on an AI radio bearer (AI RB). A priority of the AI RB is lower than priorities/a priority of a signaling radio bearer (SRB) 1 and/or an SRB 2 used for normal communication. In this way, the AI training can be completed without affecting the normal communication, to ensure reliability and efficiency of the communication function.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data is lower than a priority of a data radio bearer (DRB) used for normal communication. In this way, reporting of the AI data can be completed without affecting the normal communication, to ensure the reliability and the efficiency of the communication function.

Further, the second AI parameter may be determined by the first access network device based on AI capability information of the terminal device, to avoid a case in which a configured AI training task cannot be implemented because a configured second AI parameter exceeds an AI capability of the terminal device. This saves signaling resources and reduces training time, and further improves the accuracy and the efficiency of the AI training.

Correspondingly, the communication method provided in the first aspect may further include: The first access network device sends a first request message to the terminal device. The first request message is used to request the AI capability information of the terminal device. The first access network device receives a first response message from the terminal device. The first response message includes the AI capability information of the terminal device. In this way, the AI capability information of the terminal device can be obtained.

It should be understood that the AI capability information of the terminal device may alternatively be obtained in another manner, for example, may be obtained from an operation administration and maintenance (OAM) device or a core network element. This is not specifically limited in this embodiment of this application.

For example, the AI parameter may be a network slice-level parameter, a parameter based on a type of the terminal device, or a parameter based on a service type, to meet requirements of AI training of different purposes or types. This is not specifically limited in this embodiment of this application.

For example, the first access network device may include a radio access network intelligent controller (RIC) and a centralized unit (CU). The AI protocol layer of the first access network device is located in the RIC, and the RRC protocol layer of the first access network device is located in the CU. The RIC is used for AI function-related communication between the first access network device and the core network element, and the CU is used for non-AI function communication between the first access network device and the core network element and between the first access network device and the terminal device, so that the AI function can be further separated from the communication function, and the technical complexity of the first access network device can be reduced, to reduce the development costs and the deployment costs of the first access network device.

It should be understood that the first access network device may alternatively use another physical architecture. For example, the first access network device includes a CU and a DU, and the AI layer of the first access network device is located in the CU; or the first access network device is not divided into a CU and a DU, in other words, both the AI layer and the original protocol layer of the first access network device are located in a same entity device. An implementation of the first access network device is not specifically limited in this embodiment of this application.

In a possible design method, before that the first access network device receives the AI data from the terminal device, the communication method provided in the first aspect may further include: The first access network device receives first indication information from the core network element. The first indication information is used to indicate that the core network element allows the first access network device to obtain the AI data of the terminal device, to protect user privacy.

Optionally, the communication method provided in the first aspect may further include: The first access network device sends a handover request message to a second access network device. The handover request message may carry second indication information. The second indication information is used to indicate whether the second access network device is allowed to obtain the AI data of the terminal device. In this way, the second access network device does not need to obtain the second indication information from the core network element, so that a quantity of times of signaling interworking can be reduced, to save signaling resources, and further improve the efficiency of the AI training.

In a possible design method, before that the first access network device receives the AI data from the terminal device, the communication method provided in the first aspect may further include. The first access network device sends a second request message to the terminal device. The second request message is used to request the terminal device to report the AI data. To be specific, the terminal device may report a specified type of AI data and/or a specified quantity of AI data based on request time configured by the first access network device, so that peak hours of the normal communication can be avoided to ensure reliability of the normal communication, and reporting of redundant AI data can be avoided to further improve the accuracy and the efficiency of the AI training.

It should be noted that the first access network device may deliver the second request message to the terminal device together with the AI parameter. For example, the first access network device may send the second request message and the AI parameter by using a same piece of RRC signaling, or may separately send the second request message and the AI parameter to the terminal device. For example, the first access network device may send the second request message and the AI parameter by using two pieces of RRC signaling. This is not specifically limited in this embodiment of this application.

It should be understood that the terminal device may alternatively determine a reporting occasion and reporting content of the AI data by itself, for example, periodically report the AI data. Alternatively, the terminal device may report the AI data when a network trigger event occurs. The network trigger event may be dynamically configured or preconfigured by the first access network device. This is not specifically limited in this embodiment of this application.

According to a second aspect, a communication method is provided. The communication method includes: A terminal device receives an AI parameter from a first access network device. The AI parameter is used to indicate AI data that needs to be obtained and an AI data obtaining manner. Then, an AI protocol layer of the terminal device obtains the AI data based on the AI parameter. The AI protocol layer of the terminal device is an upper layer of a radio link control (RRC) protocol layer of the terminal device. Then, the terminal device sends the AI data to the first access network device.

In a possible design method, after that an AI protocol layer of the terminal device obtains the AI data based on the AI parameter, the communication method provided in the second aspect may further include. The AI protocol layer of the terminal device encapsulates the AI data into a second AI protocol data unit (AI PDU), and the AI protocol layer of the terminal device sends the second AI PDU to the RRC protocol layer of the terminal device. Then, the RRC protocol layer of the terminal device may add encapsulation information of the RRC protocol layer to the second AI PDU and send the second AI PDU. In this way, the AI protocol layer of the terminal device can be separated from an existing protocol layer of the terminal device, so that flexibility of an AI function supported by the terminal device can be improved. In addition, the existing protocol layer does not need to perform an AI-related operation, so that impact of the AI function on a communication function can be reduced, and technical complexity of the terminal device can be reduced, to reduce development costs of the terminal device.

In a possible design method, the AI parameter may include a first AI parameter. The first AI parameter is received by using a broadcast AI system information block (AI SIB). In other words, the first AI parameter does not limit a terminal device that reports the AI data, that is, a plurality of terminal devices may report the AI data, so that the first access network device completes AI training based on statistical results of the AI data reported by the plurality of terminals, to improve accuracy and efficiency of the AI training.

Further, the AI parameter may further include a second AI parameter. The second AI parameter is received by using RRC dedicated signaling, and a priority of the second AI parameter is higher than a priority of the first AI parameter. Because the second AI parameter limits a terminal device that reports the AI data, for example, limits a type and a service type of the terminal device, and is more targeted than the first AI parameter, the priority of the second AI parameter is higher than the priority of the first AI parameter, that is, the terminal device preferentially uses the second AI parameter to obtain and report the AI data. This can further improve the accuracy and the efficiency of the AI training.

Optionally, the RRC dedicated signaling may be received on an AI radio bearer (AI RB). A priority of the AI RB is lower than priorities/a priority of a signaling radio bearer (SRB) 1 and/or an SRB 2. In this way, the AI training can be completed without affecting normal communication, to ensure reliability and efficiency of the communication.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data is lower than a priority of a DRB used for normal communication. In this way, reporting of the AI data can be completed without affecting the normal communication, to ensure reliability and efficiency of the communication function.

Further, the second AI parameter may be determined based on AI capability information of the terminal device, to avoid a case in which a configured AI training task cannot be implemented because a configured second AI parameter exceeds an AI capability of the terminal device. This saves signaling resources and reduces training time, and further improves the accuracy and the efficiency of the AI training.

Correspondingly, the communication method provided in the second aspect may further include: The terminal device receives a first request message from the first access network device. The first request message is used to request the AI capability information of the terminal device. The terminal device sends a first response message to the first access network device. The first response message includes the AI capability information of the terminal device. In this way, the AI capability information of the terminal device can be obtained.

For example, the AI parameter may be a network slice-level parameter, a parameter based on a type of the terminal device, or a parameter based on a service type, to meet requirements of AI training of different purposes or types. This is not specifically limited in this embodiment of this application.

Optionally, the AI protocol layer may alternatively be an upper layer of a non-access stratum (NAS) protocol layer of the terminal device. Correspondingly, the AI protocol layer is further used for AI function interaction between the terminal device and a core network.

In a possible design method, before that the terminal device sends the AI data to the first access network device, the communication method provided in the second aspect may further include: The terminal device receives a second request message from the first access network device. The second request message is used to request the terminal device to report the AI data. To be specific, the terminal device may report a specified type of AI data and a specified quantity of AI data based on request time configured by the first access network device, so that peak hours of the normal communication can be avoided to ensure the reliability of the normal communication, and reporting of redundant AI data can be avoided to further improve the accuracy and the efficiency of the AI training.

It should be understood that the terminal device may alternatively determine a reporting occasion and reporting content of the AI data by itself, for example, periodically report the AI data. Alternatively, the terminal device may report the AI data when a network trigger event occurs. The network trigger event may be dynamically configured or preconfigured by the first access network device. This is not specifically limited in this embodiment of this application.

In addition, for technical effects of the communication method provided in the second aspect, refer to technical effects of the communication method provided in the first aspect. Details are not described herein again.

According to a third aspect, a communication apparatus is provided. The communication apparatus includes a processing module and a transceiver module. The processing module includes an artificial intelligence (AI) protocol layer and a radio link control (RRC) protocol layer of the communication apparatus. The AI protocol layer of the communication apparatus is an upper layer of the RRC protocol layer of the communication apparatus. The AI protocol layer of the communication apparatus is configured to generate an AI parameter. The transceiver module is configured to send the AI parameter to a terminal device. The AI parameter is used to indicate AI data that needs to be obtained and an AI data obtaining manner. The transceiver module is further configured to receive the AI data from the terminal device.

In a possible design, the AI protocol layer of the communication apparatus provided in the third aspect is further configured to encapsulate the AI parameter into a first AI protocol data unit (AI PDU). The AI protocol layer of the communication apparatus provided in the third aspect is further configured to send the first AI PDU to the RRC protocol layer of the communication apparatus.

In a possible design, the AI parameter may include a first AI parameter. The first AI parameter is sent by using a broadcast AI system information block (AI SIB).

Further, the AI parameter may further include a second AI parameter. The second AI parameter is sent by using RRC dedicated signaling, and a priority of the second AI parameter is higher than a priority of the first AI parameter.

Optionally, the RRC dedicated signaling may be sent on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the AI protocol layer of the communication apparatus provided in the third aspect is further configured to determine the second AI parameter based on AI capability information of the terminal device.

Correspondingly, the transceiver module is further configured to send a first request message to the terminal device. The first request message is used to request the AI capability information of the terminal device. The transceiver module is further configured to receive a first response message from the terminal device. The first response message includes the AI capability information of the terminal device.

It should be understood that the AI capability information of the communication apparatus provided in the third aspect may alternatively be obtained in another manner, for example, may be obtained from an OAM device or a core network element. This is not specifically limited in this embodiment of this application.

For example, the AI parameter may be a network slice-level parameter, a parameter based on a type of the terminal device, or a parameter based on a service type.

For example, the communication apparatus provided in the third aspect may include a radio access network intelligent controller (RIC) and a centralized unit (CU). The AI protocol layer of the communication apparatus provided in the third aspect is located in the RIC, and the RRC protocol layer of the communication apparatus provided in the third aspect is located in the CU.

It should be understood that the communication apparatus provided in the third aspect may alternatively use another physical architecture. For example, the communication apparatus provided in the third aspect includes a CU and a DU, and the AI layer of the communication apparatus provided in the third aspect is located in the CU; or the communication apparatus provided in the third aspect is not divided into a CU and a DU, in other words, both the AI layer and an original protocol layer of the communication apparatus provided in the third aspect are located in a same entity device. An implementation of the communication apparatus provided in the third aspect is not specifically limited in this embodiment of this application.

In a possible design, the transceiver module is further configured to: before the transceiver module receives the AI data from the terminal device, receive first indication information from the core network element. The first indication information is used to indicate that the core network element allows the communication apparatus to obtain the AI data of the terminal device.

Optionally, the transceiver module is further configured to send a handover request message to a second access network device. The handover request message carries second indication information. The second indication information is used to indicate whether the second access network device is allowed to obtain the AI data of the terminal device.

In a possible design, the transceiver module is further configured to: before the transceiver module receives the AI data from the terminal device, send a second request message to the terminal device. The second request message is used to request the terminal device to report the AI data.

Optionally, the communication apparatus provided in the third aspect may further include a storage module, and the storage module stores a program or instructions. When the processing module executes the program or the instructions, the communication apparatus provided in the third aspect is enabled to perform a function of the first access network device in the communication method provided in the first aspect.

It should be noted that the communication apparatus in the third aspect may be an access network device, or may be a chip or a chip system disposed in the access network device. This is not limited in this application.

In addition, for technical effects of the communication apparatus provided in the third aspect, refer to technical effects of the communication method provided in the first aspect. Details are not described herein again.

According to a fourth aspect, a communication apparatus is provided. The communication apparatus includes a processing module and a transceiver module. The processing module includes an artificial intelligence (AI) protocol layer and a radio link control (RRC) protocol layer of the communication apparatus, and the AI protocol layer of the communication apparatus is an upper layer of the RRC protocol layer of the communication apparatus. The transceiver module is configured to receive an AI parameter from a first access network device. The AI parameter is used to indicate AI data that needs to be obtained and an AI data obtaining manner. The AI protocol layer of the communication apparatus provided in the fourth aspect is configured to obtain the AI data based on the AI parameter. The transceiver module is further configured to send the AI data to the first access network device.

In a possible design, the AI protocol layer of the communication apparatus provided in the fourth aspect is further configured to, after the AI protocol layer of the communication apparatus provided in the fourth aspect obtains the AI data based on the AI parameter, encapsulate the AI data into a second AI protocol data unit (AI PDU). The AI protocol layer of the communication apparatus provided in the fourth aspect is further configured to send the second AI PDU to the RRC protocol layer of the communication apparatus provided in the fourth aspect.

In a possible design, the AI parameter may include a first AI parameter. The first AI parameter is received by using a broadcast AI system information block (AI SIB).

Further, the AI parameter may further include a second AI parameter. The second AI parameter is received by using RRC dedicated signaling, and a priority of the second AI parameter is higher than a priority of the first AI parameter.

Optionally, the RRC dedicated signaling is received on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the second AI parameter may be determined based on AI capability information of the communication apparatus provided in the fourth aspect.

Correspondingly, the transceiver module is further configured to receive a first request message from the first access network device. The first request message is used to request the AI capability information of the communication apparatus provided in the fourth aspect. The transceiver module is further configured to send a first response message to the first access network device. The first response message includes the AI capability information of the communication apparatus provided in the fourth aspect.

For example, the AI parameter may be a network slice-level parameter, a parameter based on a type of the terminal device, or a parameter based on a service type.

Optionally, the AI protocol layer may be an upper layer of a non-access stratum (NAS) protocol layer of the communication apparatus provided in the fourth aspect, and the AI protocol layer of the communication apparatus provided in the fourth aspect is further used for AI function interaction between the communication apparatus provided in the fourth aspect and a core network.

In a possible design, the transceiver module is further configured to: before the transceiver module sends the AI data to the first access network device, receive a second request message from the first access network device. The second request message is used to request the communication apparatus to report the AI data.

It should be noted that the communication apparatus provided in the fourth aspect may alternatively determine a reporting occasion and reporting content of the AI data by itself, for example, periodically report the AI data. Alternatively, the communication apparatus provided in the fourth aspect may further trigger reporting of the AI data when a network trigger event occurs. The network trigger event may be dynamically configured or preconfigured by the first access network device. This is not specifically limited in this embodiment of this application.

Optionally, the communication apparatus provided in the fourth aspect may further include a storage module, and the storage module stores a program or instructions. When the processing module executes the program or the instructions, the communication apparatus provided in the fourth aspect is enabled to perform a function of the terminal device in the communication method provided in the second aspect.

It should be noted that the communication apparatus in the fourth aspect may be the terminal device, or may be a chip or a chip system disposed in the terminal device. This is not limited in this application.

In addition, for technical effects of the communication apparatus provided in the fourth aspect, refer to technical effects of the communication method provided in the first aspect. Details are not described herein again.

According to a fifth aspect, a communication apparatus is provided. The communication apparatus includes a processor. The processor is coupled to a memory. The memory is configured to store a computer program. The processor is configured to execute the computer program stored in the memory, to enable the communication apparatus to perform the communication method in any one of the possible implementations of the first aspect and the second aspect.

In a possible design, the communication apparatus in the fifth aspect may further include a transceiver. The transceiver may be a transceiver circuit or an input/output interface. The transceiver may be used by the communication apparatus to communicate with another communication apparatus.

In this application, the communication apparatus in the fifth aspect may be a terminal device and/or an access network device, or a chip or a chip system disposed in the terminal device and/or the access network device.

For technical effects of the communication apparatus in the fifth aspect, refer to technical effects of the communication method in any one of the implementations of the first aspect and the second aspect. Details are not described herein again.

According to a sixth aspect, a chip system is provided. The chip system includes a processor and an input/output port. The processor is configured to implement a processing function in the first aspect or the second aspect, and the input/output port is configured to implement sending and receiving functions in the first aspect or the second aspect.

In a possible design, the chip system further includes a memory. The memory is configured to store program instructions and data for implementing the functions in the first aspect or the second aspect.

The chip system may include a chip, or may include a chip and another discrete component.

According to a seventh aspect, a communication system is provided. The communication system includes a terminal device and an access network device.

According to an eighth aspect, a computer-readable storage medium is provided. The computer-readable storage medium includes a computer program or instructions. When the computer program or the instructions are run on a computer, the computer is enabled to perform the communication method in any one of the possible implementations of the first aspect and the second aspect.

According to a ninth aspect, a computer program product is provided. The computer program product includes a computer program or instructions. When the computer program or the instructions are run on a computer, the computer is enabled to perform the communication method in any one of the possible implementations of the first aspect and the second aspect.

DESCRIPTION OF EMBODIMENTS

The following describes the technical solutions of this application with reference to the accompanying drawings.

The technical solutions in embodiments of this application may be applied to various communication systems, for example, a wireless fidelity (Wi-Fi) system, a vehicle-to-everything (V2X) communication system, a device-to-device (D2D) communication system, an internet of vehicles communication system, a 4th generation (4G) mobile communication system such as a long term evolution (LTE) system, a 5th generation (5G) mobile communication system such as a new radio (NR) system, and a future communication system such as a 6th generation (6G) mobile communication system.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may also be used.

In addition, in embodiments of this application, words such as "example" and "for example" are used to represent giving an example, an illustration, or a description. Exactly, the word "example" is used to present a concept in a specific manner.

In embodiments of this application, "information", "signal", "message", "channel", and "signaling" may sometimes be interchangeably used. It should be noted that meanings expressed by the terms are consistent when differences between the terms are not emphasized. "Of", "corresponding (relevant)", and "corresponding" may sometimes be interchangeably used. It should be noted that meanings expressed by the terms are consistent when differences between the terms are not emphasized.

In embodiments of this application, sometimes a subscript, for example, $W_1$, may be written in an incorrect form, for example, W1. Expressed meanings are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with the evolution of the network architecture and emergence of a new service scenario, the technical solutions provided in embodiments of this application are also applicable to similar technical problems.

Figure 1:
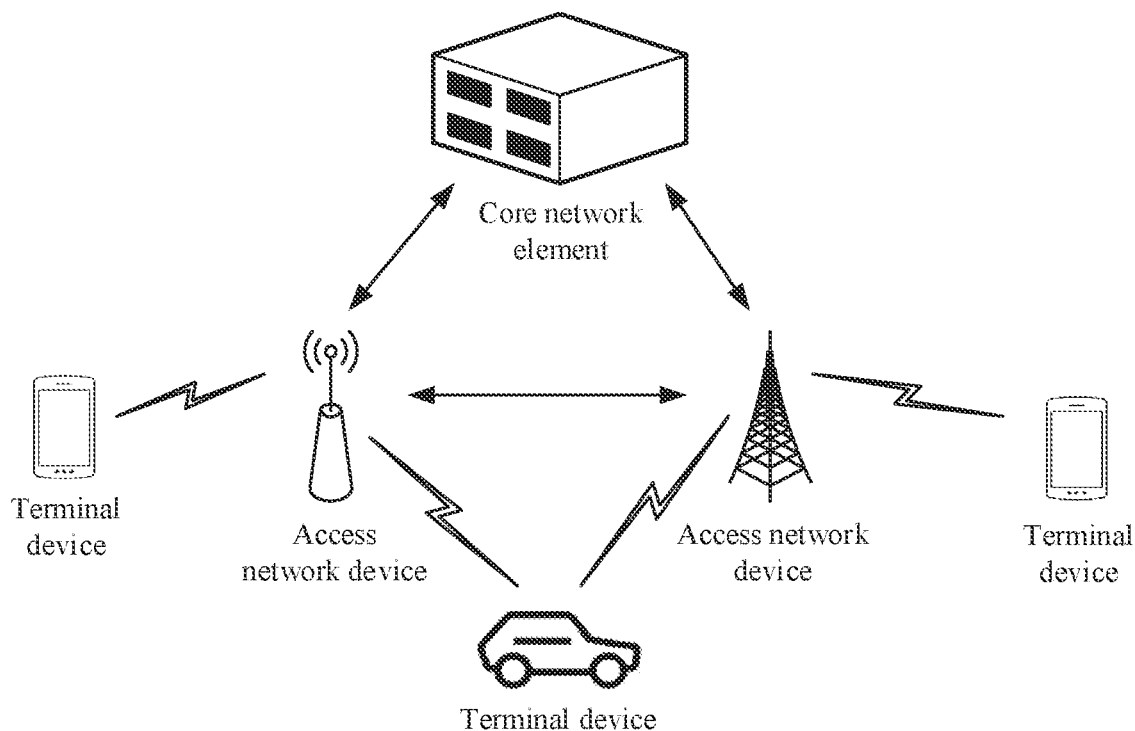
FIG. 1 is a schematic diagram of an architecture of a communication system according to an embodiment of this application.

FIG. 1 is a schematic diagram of an architecture of a communication system to which a communication method according to an embodiment of this application is applicable. For ease of understanding embodiments of this application, a communication system shown in FIG. 1 is first used as an example to describe in detail a communication system applicable to embodiments of this application. It should be noted that the solutions in embodiments of this application may also be applied to another mobile communication system, and a corresponding name may also be replaced with a name of a corresponding function in the another mobile communication system.

As shown in FIG. 1, the communication system includes one or more access network devices and one or more terminal devices. Optionally, the communication system may further include a core network including one or more core network elements.

The access network device is a device that is located on a network side of the communication system and that has a wireless transceiver function, or a chip or a chip system that may be disposed in the device. The access network device includes but is not limited to: an access point (AP) in a wireless fidelity (Wi-Fi) system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (transmission reception point, TRP; or transmission point, TP), or the like. The access network device may alternatively be a gNB or a transmission point (TRP or TP) in a 5G system, for example, a new radio (NR) system, or one antenna panel or a group of antenna panels (including a plurality of antenna panels) of a base station in a 5G system.

The access network device may alternatively be a network node, such as a baseband unit (BBU), a distributed unit (DU), or a road side unit (RSU) having a base station function, that constitutes a gNB or a transmission point.

The terminal device is a terminal that accesses the communication system and that has a wireless transceiver function, or a chip or a chip system that may be disposed in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer that has a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a vehicle-mounted terminal, an RSU that has a terminal function, or the like. The terminal device in this application may alternatively be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement the communication method provided in this application.

It should be noted that the communication method provided in embodiments of this application may be used for communication between the access network device and the terminal device shown in FIG. 1. Optionally, the communication method may further be used for communication between the access network device and the core network element.

It should be understood that FIG. 1 is merely a simplified schematic diagram used as an example for ease of understanding. The communication system may further include another network device and/or another terminal device not shown in FIG. 1.

Figure 2:
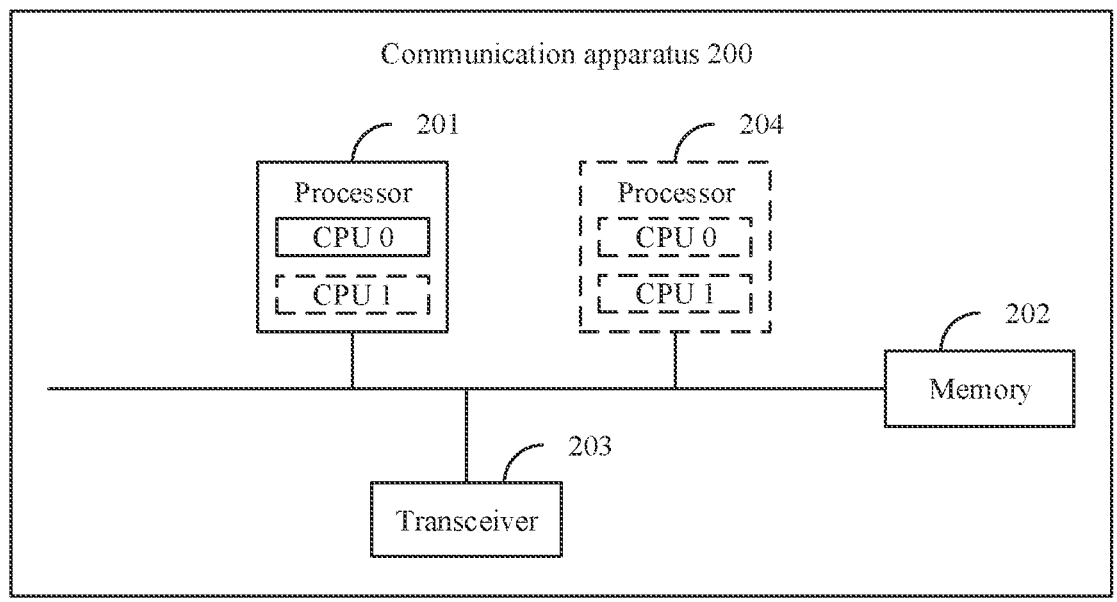
FIG. 2 is a schematic diagram 1 of a structure of a communication apparatus according to an embodiment of this application.

FIG. 2 is a schematic diagram of a structure of a communication apparatus that can be configured to perform a communication method according to an embodiment of this application. The communication apparatus may be a terminal device, or may be a chip used in the terminal device or another component having a terminal function. Alternatively, the communication apparatus may be an access network device, or may be a chip used in the access network device or another component having an access network device function.

As shown in FIG. 2, the communication apparatus 200 may include a processor 201, a memory 202, and a transceiver 203. The processor 201 is coupled to the memory 202 and the transceiver 203. For example, the processor 201 may be connected to the memory 202 and the transceiver 203 through a communication bus.

The following describes each component of the communication apparatus 200 in detail with reference to FIG. 2.

The processor 201 is a control center of the communication apparatus 200, and may be one processor or may be a collective term of a plurality of processing elements. For example, the processor 201 is one or more central processing units (CPUs), or may be an application-specific integrated circuit (ASIC), or may be configured as one or more integrated circuits implementing embodiments of this application, for example, one or more microprocessors (digital signal processors, DSPs) or one or more field programmable gate arrays (FPGAs).

The processor 201 may execute various functions of the communication apparatus 200 by running or executing a software program stored in the memory 202 and invoking data stored in the memory 202.

For example, the processor 201 may be configured to implement functions of the AI protocol layer and the RRC protocol layer in the following method embodiments, for example, configured to perform functions of the AI protocol layer and the RRC protocol of the access network device in the following S301 and S302, or configured to perform functions of the AI protocol layer and the RRC protocol of the terminal device in the following S303 and S304. For a specific implementation, refer to the following method embodiments. Details are not described herein again.

During specific implementation, in an embodiment, the processor 201 may include one or more CPUs, for example, a CPU 0 and a CPU 1 shown in FIG. 2.

During specific implementation, in an embodiment, the communication apparatus 200 may alternatively include a plurality of processors, for example, the processor 201 and a processor 204 shown in FIG. 2. Each of the processors may be a single-core processor (single-CPU) or may be a multi-core processor (multi-CPU). The processor herein may be one or more communication devices, circuits, and/or processing cores configured to process data (for example, computer program instructions).

The memory 202 may be a read-only memory (ROM) or another type of static storage communication device that can store static information and instructions; or a random access memory (RAM) or another type of dynamic storage communication device that can store information and instructions. The memory 202 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 202 may be integrated with the processor 201, or may exist independently, and is coupled to the processor 201 through an input/output port (not shown in FIG. 2) of the communication apparatus 200. This is not specifically limited in this embodiment of this application.

The memory 202 is configured to store a software program for executing the solution of this application, and the processor 201 controls execution. For a specific implementation, refer to the following method embodiments. Details are not described herein.

The transceiver 203 is configured to communicate with another communication apparatus. For example, the communication apparatus 200 is a terminal device, and the transceiver 203 may be configured to communicate with a network device or communicate with another terminal device. For another example, the communication apparatus 200 is a network device, and the transceiver 203 may be configured to communicate with a terminal device or communicate with another network device. In addition, the transceiver 203 may include a receiver and a transmitter (not respectively shown in FIG. 2). The receiver is configured to implement a receiving function, and the transmitter is configured to implement a sending function. The transceiver 203 may be integrated with the processor 201, or may exist independently, and is coupled to the processor 201 through the input/output port (not shown in FIG. 2) of the communication apparatus 200. This is not specifically limited in this embodiment of this application.

It should be noted that a structure of the communication apparatus 200 shown in FIG. 2 does not constitute a limitation on the communication apparatus. An actual communication apparatus may include more or fewer components than those shown in the figure, or combine some components, or have different component arrangement.

The following describes in detail a communication method provided in embodiments of this application with reference to FIG. 3 to FIG. 19.

Figure 3:
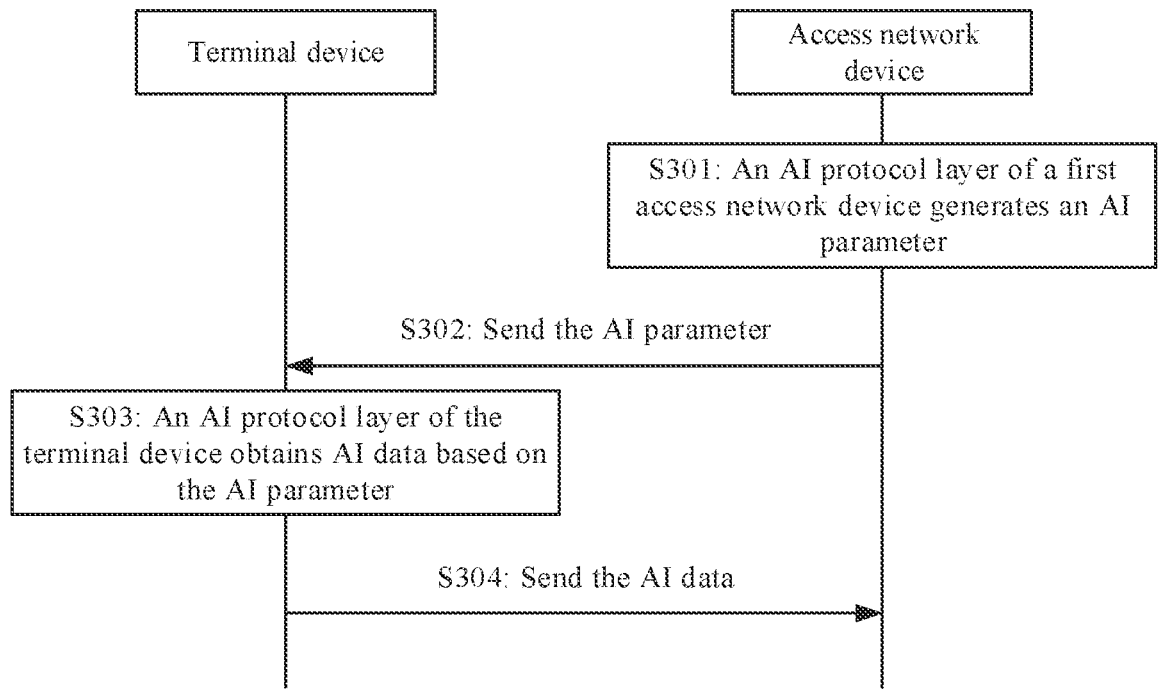
FIG. 3 is a schematic flowchart of a communication method according to an embodiment of this application.

For example, FIG. 3 is a schematic flowchart of a communication method according to an embodiment of this application. The communication method is applicable to the communication between the access network device and the terminal device in the communication system shown in FIG. 1. As shown in FIG. 3, the communication method includes the following steps.

S301: An AI protocol layer of a first access network device generates an AI parameter.

Figure 4:
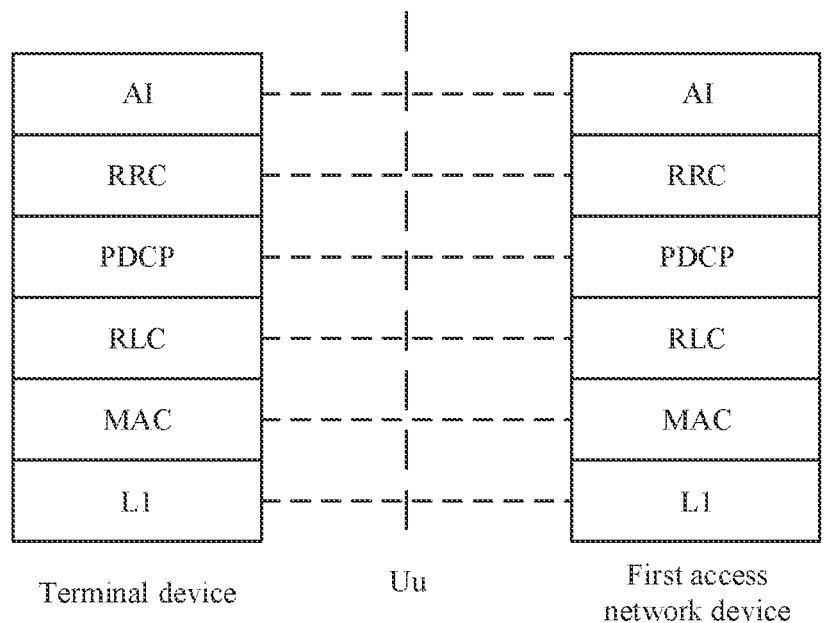
FIG. 4 is a diagram 1 of a protocol architecture according to an embodiment of this application.

For example, FIG. 4 is a diagram 1 of a protocol architecture according to an embodiment of this application. The first access network device may be any access network device shown in FIG. 1, and the terminal device may be any terminal device shown in FIG. 1. The first access network device communicates with the terminal device through a Uu interface. As shown in FIG. 4, from top to bottom, the first access network device and the terminal device each include an AI protocol layer, an RRC protocol layer, a packet data convergence protocol (PDCP) layer, a radio link control (RLC) protocol layer, a media access control (MAC) protocol layer, and a physical layer (PHY, which is also referred to as a layer 1, namely, layer 1, L1). In other words, the AI protocol layer of the first access network device is an upper layer of the radio link control (radio resource control, RRC) protocol layer of the first access network device. Correspondingly, the AI protocol layer of the terminal device is also an upper layer of the RRC protocol layer of the terminal device.

Figure 11:
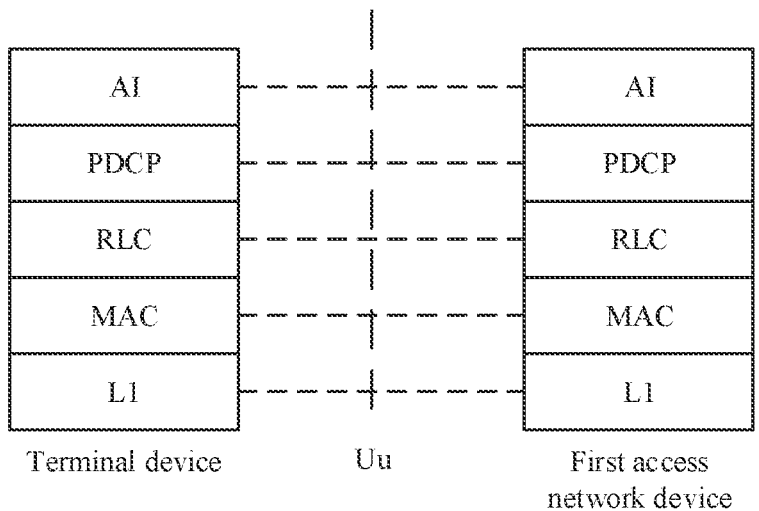
FIG. 11 is a diagram 2 of a protocol architecture according to an embodiment of this application.

For example, FIG. 11 is a diagram 2 of a protocol architecture according to an embodiment of this application. The first access network device may be any access network device shown in FIG. 1, and the terminal device may be any terminal device shown in FIG. 1. The first access network device communicates with the terminal device through a Uu interface. As shown in FIG. 11, from top to bottom, the first access network device and the terminal device each include an AI protocol layer, a PDCP protocol layer, an RLC protocol layer, a MAC protocol layer, and a physical layer. In other words, the AI protocol layer of the first access network device is an upper layer of the PDCP protocol layer of the first access network device. Correspondingly, the AI protocol layer of the terminal device is also an upper layer of the PDCP protocol layer of the terminal device.

It should be noted that the protocol architecture shown in FIG. 11 is a protocol architecture used for an AI function. It should be understood that, in addition to the AI function, the terminal device and the access network device further need to complete a communication function other than the AI function. The following provides descriptions with reference to FIG. 12.

Figure 12:
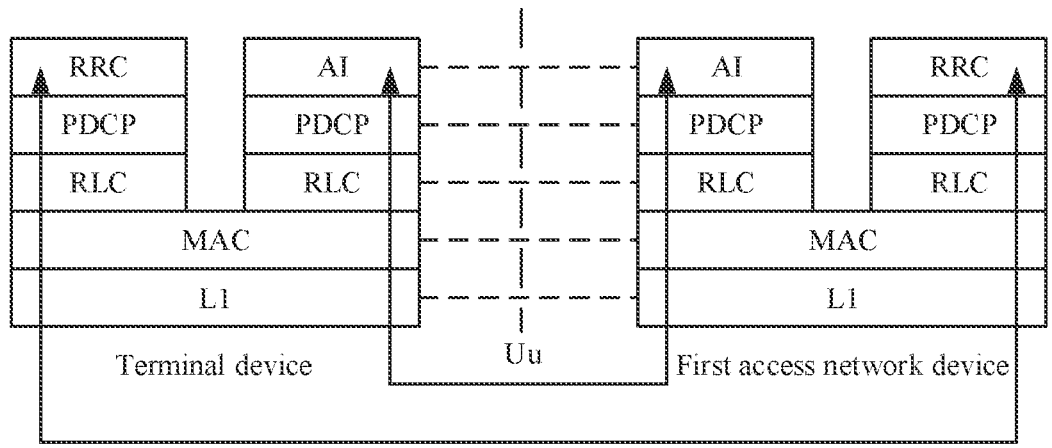
FIG. 12 is a diagram 3 of a protocol architecture according to an embodiment of this application.

For example, FIG. 12 is a diagram 3 of a protocol architecture according to an embodiment of this application.

In the protocol architecture shown in FIG. 12, in addition to the protocol layer entities used for the AI function shown in FIG. 11, protocol layers used for a communication function other than the AI function are further included. An RRC protocol layer, a PDCP protocol layer, an RLC protocol layer, a MAC protocol layer, and a physical layer may be included from top to bottom. The AI function and the communication function share the MAC protocol layer and the physical layer. For ease of differentiation, a PDCP protocol layer corresponding to an AI protocol layer may also be referred to as an AI PDCP protocol layer.

Protocol layers that are of a first access network device and a terminal device and that have a same name may be referred to as peer protocol layers. For example, an AI protocol layer of the first access network device and an AI protocol layer of the terminal device are a pair of peer protocol layers, and an RRC protocol layer of the first access network device and an RRC protocol layer of the terminal device are a pair of peer protocol layers. A peer protocol layer of a sender is configured to generate and send data, and a peer protocol layer of a receiver is configured to receive and parse the data sent by the sender.

The AI protocol layer is an independent protocol layer introduced in this embodiment of this application. The AI protocol layer is the upper layer of the RRC protocol layer shown in FIG. 4 or the upper layer of the PDCP protocol layer shown in FIG. 11, and is configured to perform an AI function-related operation, but is not configured to perform a communication function-related operation. All the protocol layers other than the AI protocol layer are configured to implement the communication function. In other words, in this embodiment of this application, the AI function is separated from the communication function, so that the AI parameter can be flexibly adjusted to meet various types of AI requirements, and the communication function is not negatively affected.

The AI protocol layer may be configured to generate the AI parameter based on a specific AI requirement. The AI parameter is used to indicate AI data that needs to be obtained and an AI data obtaining manner, and may include one or more of the following: an AI data obtaining (collection and/or training) manner, an AI algorithm model and a training parameter of the AI algorithm model, an AI data reporting occasion (periodic reporting, reporting triggered by a network event, or reporting when a reporting request is received), a type (a training result and/or a collected training sample) of the AI data and a quantity of AI data, identification information of a terminal device that executes a training or data collection task, and the like.

It should be noted that the AI parameter may be a network slice-level parameter, a parameter based on a type of the terminal device, or a parameter based on a service type, to meet requirements of AI training of different purposes or types.

The AI data is data obtained (trained and/or collected) by the terminal device based on the AI parameter, and includes but is not limited to the data obtained based on the AI parameter, for example, includes data that can be used to implement network optimization such as gradient data, various measurement reports, and various communication records.

In a possible design method, the AI parameter may include a first AI parameter. The first AI parameter is sent by the first access network device by using a broadcast AI system information block (AI SIB). Correspondingly, the first AI parameter is also obtained by the terminal device by receiving and parsing the AI system information block (AI SIB) broadcast by the first access network device. For example, the first access network device may indicate, by broadcasting the first AI parameter, all terminal devices in a coverage area of the first access network device to participate in a training task corresponding to the first AI parameter, to provide the AI data for the first access network device. In other words, the first AI parameter does not limit a terminal device that reports the AI data, and the first access network device may complete the AI training based on statistical results of AI data reported by a plurality of terminal devices. This can resolve a problem of an insufficient quantity of the AI data or a limited type of the AI data, to improve accuracy and efficiency of the AI training. For specific implementations of sending and receiving the first AI parameter, refer to related content in S302. Details are not described herein again.

Further, the AI parameter may further include a second AI parameter. The second AI parameter may be sent by using RRC dedicated signaling or AI dedicated signaling, and a priority of the second AI parameter is higher than a priority of the first AI parameter. Because the second AI parameter limits a terminal device that reports the AI data, for example, limits a type, a service type, and a location of the terminal device, and quality and/or strength of a signal received by the terminal device, the second AI parameter is generally more targeted than the first AI parameter. Therefore, the priority of the second AI parameter is higher than the priority of the first AI parameter. In other words, a same terminal device preferentially uses the second AI parameter to obtain and report the AI data, so that the accuracy and the efficiency of the AI training can be further improved. For specific implementations of sending and receiving the second AI parameter, refer to related content in S302. Details are not described herein again.

Further, the second AI parameter may be determined by the first access network device based on AI capability information of the terminal device, to avoid a case in which a configured AI training task cannot be implemented because a configured second AI parameter exceeds an AI capability of the terminal device. This can save signaling resources and reduce training time, and further improve the accuracy and the efficiency of the AI training.

Further, the communication method shown in FIG. 3 may further include the following step 1 and step 2, to obtain the AI capability information of the terminal device.

Step 1: The first access network device sends a first request message to the terminal device. Correspondingly, the terminal device receives the first request message from the first access network device. The first request message is used to request the AI capability information of the terminal device, and may be, for example, an AI capability request message.

Step 2: The terminal device sends a first response message to the first access network device. Correspondingly, the first access network device receives the first response message from the terminal device. The first response message includes the AI capability information of the terminal device, and may be, for example, an AI capability response message.

It should be noted that the AI capability request message and the AI capability response message are merely examples provided in this embodiment of this application. In actual application, a message of another name may alternatively be used to report the AI capability information of the terminal device. This is not specifically limited in this embodiment of this application.

It should be understood that the terminal device may alternatively actively report the AI capability information of the terminal device, for example, may report the AI capability information in a network registration procedure. That is, the foregoing step 1 may be considered as an optional step.

In addition, the first access network device may alternatively obtain the AI capability information of the terminal device in another manner, for example, obtain the AI capability information of the terminal device from an OAM device or a core network element. This is not specifically limited in this embodiment of this application.

In a possible design method, before that an AI protocol layer of a first access network device generates an AI parameter in S301, the communication method shown in FIG. 3 may further include the following step:

The first access network device receives first indication information from the core network element. The first indication information is used to indicate that the core network element allows the first access network device to obtain the AI data of the terminal device.

The core network element may be an independent artificial intelligence (artificial intelligence function, AIF) network element, or may be a core network element with the AI function, for example, an access and mobility management function (AMF) network element.

The first indication information may be determined by the core network element, or may come from a privacy protection instruction set by a user using the terminal device. An execution body that determines the first indication information is not limited in this embodiment of this application.

S302: The first access network device sends the AI parameter to the terminal device. Correspondingly, the terminal device receives the AI parameter from the first access network device.

In a possible design solution, refer to FIG. 4. The AI protocol layer of the first access network device may encapsulate the AI parameter generated by the first access network device in S301, for example, a first AI parameter or a second AI parameter, into a data packet, and send the data packet to the physical layer of the first access network device layer by layer in order of protocol layers from top to bottom. The physical layer of the first access network device sends the data packet by using a radio resource on the Uu interface. The following provides detailed descriptions with reference to FIG. 4.

In a possible design method, that the first access network device sends the AI parameter to the terminal device in S302 may include the following step 3 to step 6.

Step 3: The AI protocol layer of the first access network device encapsulates the AI parameter into a first AI protocol data unit (PDU). The AI parameter includes the first AI parameter, or includes the second AI parameter.

Figure 5:
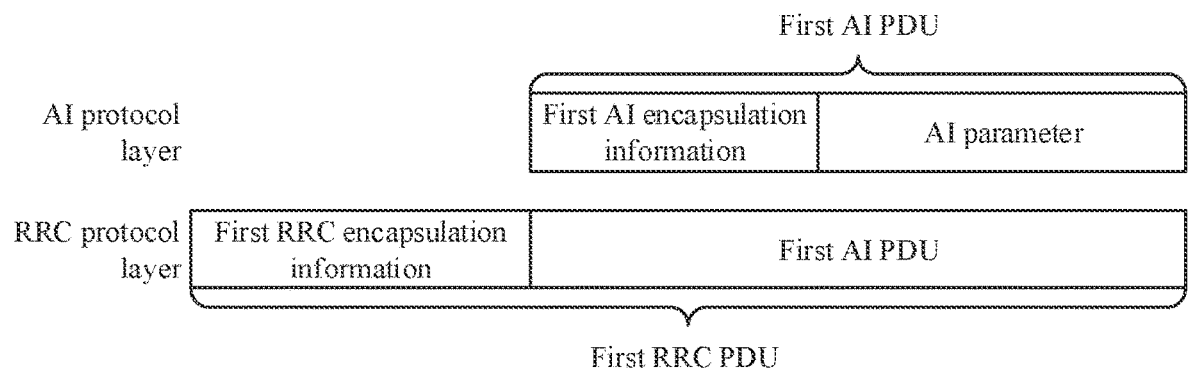
FIG. 5 is a schematic diagram 1 of a structure of a PDU according to an embodiment of this application.

For example, FIG. 5 is a schematic diagram 1 of a structure of a PDU according to an embodiment of this application. With reference to FIG. 4, as shown in FIG. 5, the AI protocol layer of the first access network device may add first AI encapsulation information to the AI parameter, to generate the first AI PDU.

It should be noted that when there are a plurality of AI parameters, fields in the first AI PDU that are specifically occupied by different AI parameters are not specifically limited in this embodiment of this application.

Step 4: The AI protocol layer of the first access network device sends the first AI PDU to the RRC protocol layer of the first access network device. Correspondingly, the RRC protocol layer of the first access network device receives the first AI PDU from the AI protocol layer of the first access network device.

For example, the AI protocol layer of the first access network device may send the first AI PDU to the RRC protocol layer of the first access network device through an interface between the AI protocol layer of the first access network device and the RRC protocol layer of the first access network device.

Step 5: The RRC protocol layer of the first access network device encapsulates the first AI PDU into a first RRC PDU, and sends the first RRC PDU.

With reference to FIG. 4, as shown in FIG. 5, the RRC protocol layer of the first access network device adds first RRC encapsulation information to the first AI PDU, to generate the first RRC PDU, and then sends the first RRC PDU by using an RRC message.

For example, the first RRC PDU including the first AI parameter may be sent by using a broadcast AI SIB. The broadcast AI SIB is a SIB that is specially used to send the first AI parameter and that is introduced in this embodiment of this application, to distinguish the broadcast AI SIB from SIBs related to communication function broadcasting, for example, a SIB 1 and a SIB 2, so that an AI function is further separated from a communication function.

For example, the first RRC PDU including the second AI parameter may be sent by using RRC dedicated signaling. The RRC dedicated signaling is RRC signaling that is specially used to send the second AI parameter and that is introduced in this embodiment of this application, to distinguish the RRC dedicated signaling from RRC signaling related to communication function configuration, for example, RRC connection establishment/re-establishment/configuration/re-configuration signaling, so that the AI function is further separated from the communication function. A radio bearer used to send the RRC dedicated signaling is a radio bearer used to send the second AI parameter, and is usually dynamically configured by the first access network device.

Further, a dedicated radio bearer may be configured for the RRC dedicated signaling that carries the second AI parameter, to further separate the AI function from the communication function at a resource configuration level. Therefore, optionally, the RRC dedicated signaling may be sent on an AI radio bearer (RB). The AI RB is a radio bearer that is specially used to carry the second AI parameter and that is introduced in this embodiment of this application, and a priority of the AI RB is lower than priorities/a priority of a signaling radio bearer (SRB) 1 and/or an SRB 2 used for normal communication. The SRB 1 is used to carry RRC signaling, that is, used to transmit configuration information of an air interface radio resource. The SRB 2 is used to carry NAS signaling. In this way, AI training can be completed without affecting the normal communication, to ensure reliability and efficiency of the communication.

It can be learned from step 3 to step 5 that, in this embodiment of this application, the AI protocol layer of the first access network device can be separated from an existing protocol layer of the first access network device, and the AI function can be further separated from the communication function, so that flexibility of the AI function supported by the first access network device can be improved. In addition, the existing protocol layer does not need to perform an AI-related operation, so that impact of the AI function on the communication function can be reduced, and technical complexity of the first access network device can be reduced, to reduce development costs and deployment costs of the first access network device.

It should be noted that step 3 to step 5 are described by using the protocol architecture of the first access network device shown in FIG. 4 as an example. In actual application, based on different physical architectures, protocol layers of the first access network device may be located in different physical entities. The following further describes specific implementations of step 3 to step 5 with reference to several physical architectures of the first access network device.

For example, FIG. 6 to FIG. 9 respectively show physical architectures 1 to 4 of a first access network device according to an embodiment of this application. The first access network device may be implemented by using any one of the physical architectures shown in FIG. 6 to FIG. 9, provided that the AI protocol layer of the first access network device is located above the RRC protocol layer of the first access network device. The following provides descriptions with reference to FIG. 4 and FIG. 5.

Figure 6:
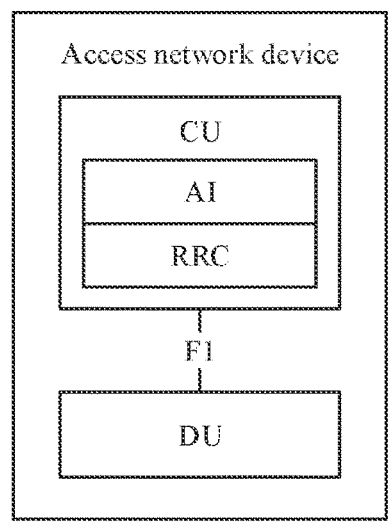
FIG. 6 is a diagram 1 of an architecture of an access network device according to an embodiment of this application.

As shown in FIG. 6, the first access network device may include a CU and a DU. The AI protocol layer and the RRC protocol layer of the first access network device are located in the CU, and the CU communicates with the DU through an F1 interface.

With reference to FIG. 4 and FIG. 5, as shown in FIG. 6, the foregoing step 3 to step 5 may be considered as internal operations of the CU. Then, the CU may send a data packet including an AI parameter to the DU through the F1 interface, and the DU sends the data packet.

Figure 7:
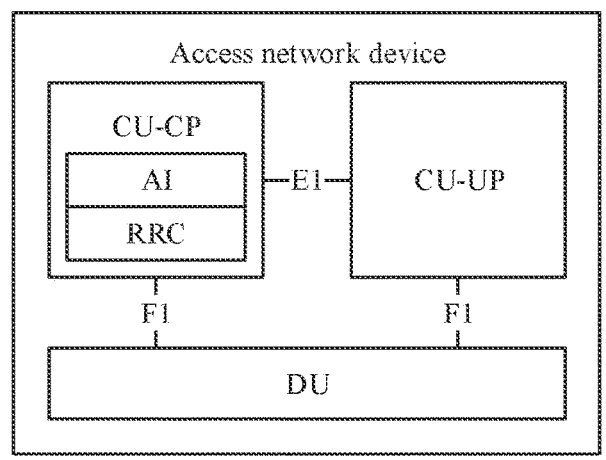
FIG. 7 is a diagram 2 of an architecture of an access network device according to an embodiment of this application.

Optionally, as shown in FIG. 7, the CU of the first access network device may be further divided into two parts: a control plane (CU-control plane, CU-CP) and a user plane (CU-user plane, CU-UP). The AI protocol layer and the RRC protocol layer of the first access network device are located in the CU-CP. The CU-CP communicates with the CU-UP through an E1 interface, and the CU-CP and the CU-UP each communicate with the DU through an F1 interface. With reference to FIG. 4 and FIG. 5, as shown in FIG. 7, the foregoing step 3 to step 5 may be considered as internal operations of the CU-CP. Then, the CU-CP may send a data packet including an AI parameter to the DU through the F1 interface, and the DU sends the data packet.

Figure 8:
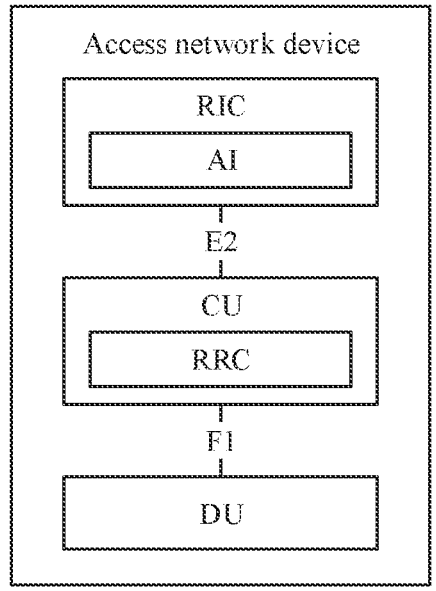
FIG. 8 is a diagram 3 of an architecture of an access network device according to an embodiment of this application.

Further, as shown in FIG. 8, for the first access network device that uses an open radio access network (O-RAN) architecture, the AI protocol layer of the first access network device may be physically separated from a protocol layer that implements the communication function. Specifically, with reference to FIG. 4 and FIG. 5, as shown in FIG. 8, the first access network device includes a RAN intelligent controller (RIC), a CU, and a DU. The RIC communicates with the CU through an E2 interface, and the CU communicates with the DU through an F1 interface. The AI protocol layer of the first access network device is located in the RIC, and the RRC protocol layer of the first access network device is located in the CU. With reference to FIG. 4 and FIG. 5, as shown in FIG. 8, the foregoing step 3 may be considered as an internal operation of the RIC. Then, the RIC sends a first AI PDU including an AI parameter to the CU through the E2 interface, that is, performs step 4. The CU may perform step 5 and send a data packet including the AI parameter to the DU through the F1 interface, and the DU sends the data packet.

In this way, the RIC is used for AI function-related communication between the first access network device and the core network element, and the CU is used for non-AI function communication between the first access network device and the core network element and between the first access network device and the terminal device, so that the AI function can be further separated from the communication function, and technical complexity of the first access network device can be reduced, to reduce development costs and deployment costs of the first access network device.

Figure 9:
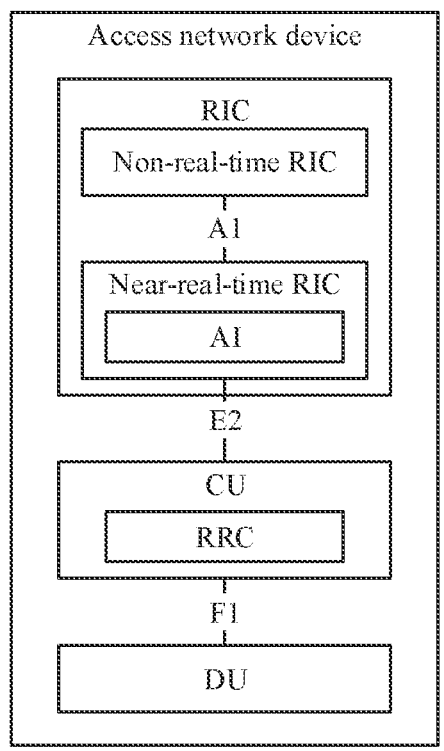
FIG. 9 is a diagram 4 of an architecture of an access network device according to an embodiment of this application.

Further, with reference to FIG. 8, as shown in FIG. 9, the RIC of the first access network device may be further classified into a non-real-time RIC and a near-real-time RIC, and the non-real-time RIC communicates with the near-real-time RIC through an AI interface. The near-real-time RIC includes functions such as an artificial intelligence training model, radio connection management, mobility management, quality of service (QoS) management, and interference management. That is, the AI protocol layer of the first access network device is located in the near-real-time RIC, and the RRC protocol layer of the first access network device is located in the CU. For a function and an implementation of the non-real-time RIC, refer to a conventional technology. Details are not described in this embodiment of this application.

With reference to FIG. 4 and FIG. 5, as shown in FIG. 9, the foregoing step 3 may be considered as an internal operation of the near-real-time RIC. Then, the near-real-time RIC sends a first AI PDU including an AI parameter to the CU through an E2 interface, that is, performs step 4. The CU may perform step 5 and send a data packet including the AI parameter to the DU through an F1 interface, and the DU sends the data packet.

It should be noted that the first access network device may alternatively use another physical architecture. For example, the first access network device is not divided into a CU and a DU internally. In other words, both the AI protocol layer and an original communication protocol layer of the first access network device are located in a same entity device. For another example, there may be one or more CUs and DUs in the first access network device. For still another example, protocol layers respectively included in a CU and a DU in the first access network device may also have a plurality of division manners. Further, the CU and the DU may be internally divided into different entities based on the protocol layers. A specific implementation of the first access network device is not limited in this embodiment of this application.

In correspondence to step 3 to step 5 in which the first access network device sends the AI parameter at the protocol layers shown in FIG. 4 from top to bottom, the terminal device may receive and parse the AI parameter at the protocol layers shown in FIG. 4 from bottom to top. Specifically, that the terminal device receives the AI parameter from the first access network device in S302 may include the following step 6 to step 8.

Step 6: The RRC protocol layer of the terminal device receives the first RRC PDU, and parses the first RRC encapsulation information to obtain the first AI PDU.

For a specific implementation, refer to the foregoing step 5. Details are not described herein again.

Step 7: The RRC protocol layer of the terminal device sends the first AI PDU to the AI protocol layer of the terminal device. Correspondingly, the RRC protocol layer of the terminal device receives the first AI PDU from the RRC protocol layer of the terminal device.

For a specific implementation, refer to the foregoing step 4. Details are not described herein again.

Step 8: The AI protocol layer of the terminal device parses the first AI PDU to obtain the AI parameter.

For a specific implementation, refer to the foregoing step 3. Details are not described herein again.

In another possible design solution, refer to FIG. 11 or FIG. 12. The AI protocol layer of the first access network device may encapsulate the AI parameter generated by the first access network device in S301, for example, a first AI parameter or a second AI parameter, into one AI PDU (namely, an AI signaling message or an AI data packet), and send the AI PDU to the physical layer of the first access network device layer by layer in order of protocol layers from top to bottom. The physical layer of the first access network device sends the AI PDU by using a radio resource on the Uu interface. The following provides detailed descriptions with reference to FIG. 11.

In a possible design method, that the first access network device sends the AI parameter to the terminal device in S302 may include the following step 1 to step 3.

Step 1: The AI protocol layer of the first access network device encapsulates the AI parameter into a third AI PDU. The AI parameter includes the first AI parameter, or includes the second AI parameter.

Figure 13:
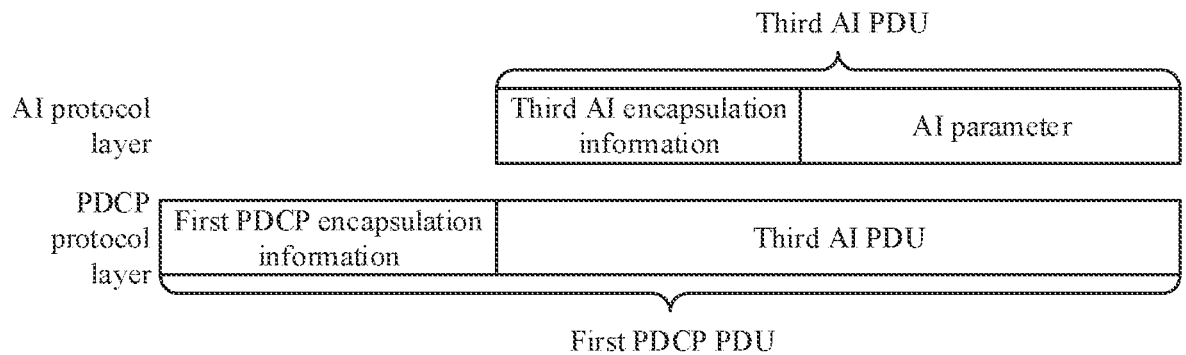
FIG. 13 is a schematic diagram 3 of a structure of a PDU according to an embodiment of this application.

For example, FIG. 13 is a schematic diagram 3 of a structure of a PDU according to an embodiment of this application. With reference to FIG. 11, as shown in FIG. 13, the AI protocol layer of the first access network device may add third AI encapsulation information to the AI parameter, to generate the third AI PDU.

It should be noted that when there are a plurality of AI parameters, fields in the third AI PDU that are specifically occupied by different AI parameters are not specifically limited in this embodiment of this application.

Step 2: The AI protocol layer of the first access network device sends the third AI PDU to the PDCP protocol layer of the first access network device. Correspondingly, the PDCP protocol layer of the first access network device receives the third AI PDU from the AI protocol layer of the first access network device.

For example, the AI protocol layer of the first access network device may send the third AI PDU to the PDCP protocol layer of the first access network device through an interface between the AI protocol layer of the first access network device and the PDCP protocol layer of the first access network device.

Step 3: The PDCP protocol layer of the first access network device encapsulates the third AI PDU into a first PDCP PDU, and sends the first PDCP PDU.

With reference to FIG. 11, as shown in FIG. 13, the PDCP protocol layer of the first access network device adds first PDCP encapsulation information to the third AI PDU, to generate the first PDCP PDU, and then sends the first PDCP PDU through a lower layer.

It should be understood that a dedicated radio bearer may be further configured for the AI PDU carrying the AI parameter, to further separate an AI function from another communication function at a resource configuration level. Therefore, optionally, the AI PDU may be sent on an AI radio bearer (RB). The AI RB is a radio bearer that is specially used to carry the AI PDU and that is introduced in this embodiment of this application, and optionally, a priority of the AI RB is lower than priorities/a priority of a signaling radio bearer (SRB) 1 and/or an SRB 2 used for normal communication. The SRB 1 is used to carry RRC signaling, that is, used to transmit configuration information of an air interface radio resource. The SRB 2 is used to carry NAS signaling. In this way, AI training can be completed without affecting the normal communication, to ensure reliability and efficiency of the communication.

It can be learned from step 1 to step 3 that, in this embodiment of this application, the AI protocol layer of the first access network device can be separated from an existing protocol layer of the first access network device, and the AI function can be further separated from the communication function, so that flexibility of the AI function supported by the first access network device can be improved. In addition, the existing protocol layer does not need to perform an AI-related operation, so that impact of the AI function on the communication function can be reduced, and technical complexity of the first access network device can be reduced, to reduce development costs and deployment costs of the first access network device.

It should be noted that step 1 to step 3 are described by using the protocol architecture of the first access network device shown in FIG. 11 as an example. In actual application, based on different physical architectures, protocol layers of the first access network device may be located in different physical entities. The following further describes specific implementations of step 1 to step 3 with reference to several physical architectures of the first access network device.

For example, FIG. 14 to FIG. 17 respectively show physical architectures 5 to 8 of a first access network device according to an embodiment of this application. The first access network device may be implemented by using any one of the physical architectures shown in FIG. 14 to FIG. 17, provided that the AI protocol layer of the first access network device is located above the PDCP protocol layer of the first access network device. The following provides descriptions with reference to FIG. 11 and FIG. 13.

Figure 14:
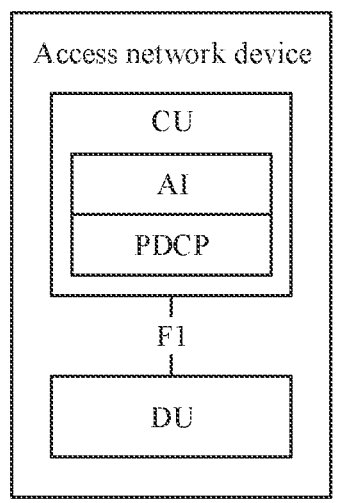
FIG. 14 is a diagram 5 of an architecture of an access network device according to an embodiment of this application.

As shown in FIG. 14, the first access network device may include a CU and a DU. The AI protocol layer and the PDCP protocol layer of the first access network device are located in the CU, and the CU communicates with the DU through an F1 interface.

With reference to FIG. 11 and FIG. 13, as shown in FIG. 14, the foregoing step 1 to step 3 may be considered as internal operations of the CU. Then, the CU may send a data packet including an AI parameter to the DU through the F1 interface, and the DU sends the data packet.

Figure 15:
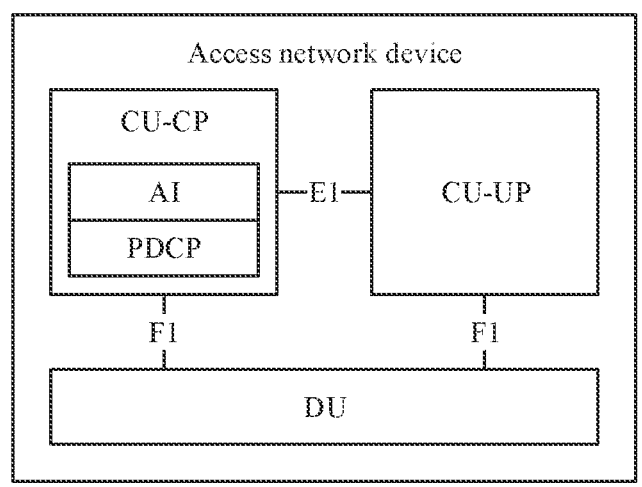
FIG. 15 is a diagram 6 of an architecture of an access network device according to an embodiment of this application.

Optionally, as shown in FIG. 15, the CU of the first access network device may be further divided into two parts: a CU-CP and a CU-UP. The AI protocol layer and the PDCP protocol layer of the first access network device are located in the CU-CP. The CU-CP communicates with the CU-UP through an E1 interface, and the CU-CP and the CU-UP each communicate with the DU through an F1 interface. With reference to FIG. 11 and FIG. 13, as shown in FIG. 15, the foregoing step 1 to step 3 may be considered as internal operations of the CU-CP. Then, the CU-CP may send a data packet including an AI parameter to the DU through the F1 interface, and the DU sends the data packet.

Figure 16:
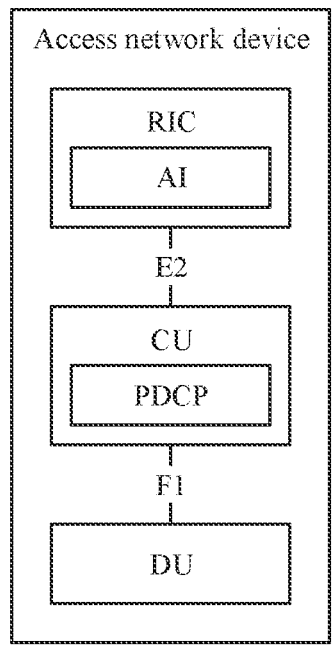
FIG. 16 is a diagram 7 of an architecture of an access network device according to an embodiment of this application.

Further, as shown in FIG. 16, for the first access network device that uses an O-RAN architecture, the AI protocol layer of the first access network device may be physically separated from a protocol layer that implements the communication function. Specifically, with reference to FIG. 11 and FIG. 13, as shown in FIG. 16, the first access network device includes an RIC, a CU, and a DU. The RIC communicates with the CU through an E2 interface, and the CU communicates with the DU through an F1 interface. The AI protocol layer of the first access network device is located in the RIC, and the PDCP protocol layer of the first access network device is located in the CU. With reference to FIG. 11 and FIG. 13, as shown in FIG. 16, the foregoing step 1 may be considered as an internal operation of the RIC. Then, the RIC sends a third AI PDU including an AI parameter to the CU through the E2 interface, that is, performs step 2. The CU may perform step 3 and send a data packet including the AI parameter to the DU through the F1 interface, and the DU sends the data packet.

In this way, the RIC is used for AI function-related communication between the first access network device and the core network element, and the CU is used for non-AI function communication between the first access network device and the core network element and between the first access network device and the terminal device, so that the AI function can be further separated from the communication function, and technical complexity of the first access network device can be reduced, to reduce development costs and deployment costs of the first access network device.

Figure 17:
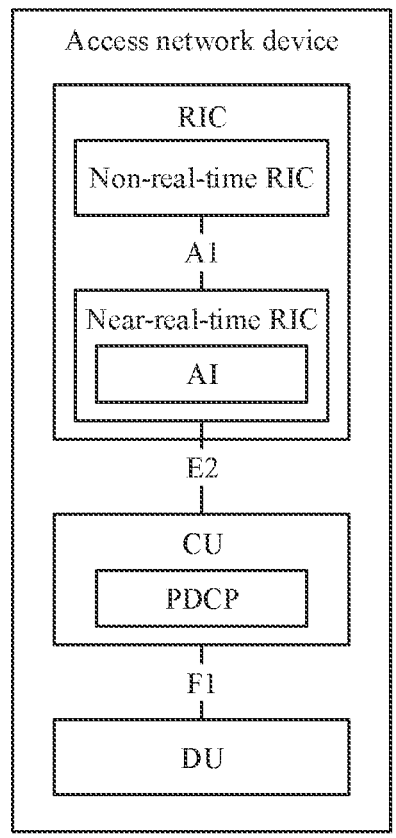
FIG. 17 is a diagram 8 of an architecture of an access network device according to an embodiment of this application.

Further, with reference to FIG. 16, as shown in FIG. 17, the RIC of the first access network device may be further classified into a non-real-time RIC and a near-real-time RIC, and the non-real-time RIC communicates with the near-real-time RIC through an AI interface. The near-real-time RIC includes functions such as an artificial intelligence training model, radio connection management, mobility management, QoS management, and interference management. That is, the AI protocol layer of the first access network device is located in the near-real-time RIC, and the PDCP protocol layer of the first access network device is located in the CU. For a function and an implementation of the non-real-time RIC, refer to a conventional technology. Details are not described in this embodiment of this application.

With reference to FIG. 11 and FIG. 13, as shown in FIG. 17, the foregoing step 1 may be considered as an internal operation of the near-real-time RIC. Then, the near-real-time RIC sends a third AI PDU including an AI parameter to the CU through an E2 interface, that is, performs step 2. The CU may perform step 3 and send a data packet including the AI parameter to the DU through an F1 interface, and the DU sends the data packet.

It should be noted that the first access network device may alternatively use another physical architecture. For example, the first access network device is not divided into a CU and a DU internally. In other words, both the AI protocol layer and a communication protocol layer of the first access network device are located in a same entity device. For another example, there may be one or more CUs and DUs in the first access network device. For still another example, protocol layers respectively included in a CU and a DU in the first access network device may also have a plurality of division manners. Further, the CU and the DU may be internally divided into different entities based on the protocol layers. A specific implementation of the first access network device is not limited in this embodiment of this application.

In correspondence to step 1 to step 3 in which the first access network device sends the AI parameter at the protocol layers shown in FIG. 11 from top to bottom, the terminal device may receive and parse the AI parameter at the protocol layers shown in FIG. 11 from bottom to top. Specifically, that the terminal device receives the AI parameter from the first access network device in S302 may include the following step 4 to step 6.

Step 4: The PDCP protocol layer of the terminal device receives a third PDCP PDU, and parses third PDCP encapsulation information to obtain the third AI PDU.

For a specific implementation, refer to the foregoing step 3. Details are not described herein again.

Step 5: The PDCP protocol layer of the terminal device sends the third AI PDU to the AI protocol layer of the terminal device. Correspondingly, the AI protocol layer of the terminal device receives the first AI PDU from the PDCP protocol layer of the terminal device.

For a specific implementation, refer to the foregoing step 2. Details are not described herein again.

Step 6: The AI protocol layer of the terminal device parses the third AI PDU to obtain the AI parameter.

For a specific implementation, refer to the foregoing step 1. Details are not described herein again.

It should be noted that, in the protocol architecture shown in FIG. 12, upper layers of the PDCP protocol layer are the RRC protocol layer and the AI protocol layer. Some PDCP entities need to deliver a data packet received from a bottom layer to the RRC protocol layer, and some PDCP entities need to deliver the data packet received from the bottom layer to the AI protocol layer. How the PDCP protocol layer knows a layer (the RRC protocol layer or the AI protocol layer) to which the data packet needs to be delivered is a problem to be resolved. In one method, when configuring (adding) an AI radio bearer for the terminal device, the first access network device includes one piece of indication information in a configuration message, where the indication information is used to indicate that an added bearer is the AI radio bearer, and the indication information may be explicit indication information, or may be implicit indication information, for example, may perform indication by using a dedicated configuration message information element. Therefore, a PDCP entity corresponding to the AI radio bearer is an AI PDCP entity, and all data packets received by the AI PDCP entity are delivered to the AI protocol layer, to resolve the foregoing problem. In another method, a protocol specifies a dedicated logical channel identifier (logical channel identification, LCID) for an AI bearer. When an LCID corresponding to one bearer is configured as the AI dedicated LCID, the bearer is the AI bearer. Therefore, when an LCID of a bearer corresponding to a PDCP entity of the terminal device is the AI dedicated LCID, the PDCP entity of the terminal device learns that received data packet is to be delivered to the AI protocol layer.

S303: The A protocol layer of the terminal device obtains the AI data based on the AI parameter.

For example, the terminal device may execute a training task and/or a collection task based on the AI parameter, and report a training result and/or collected data to the first access network device. For content of the AI data and a specific implementation of the AI data obtaining manner, refer to related content in S301. Details are not described herein again.

S304: The terminal device sends the AI data to the first access network device. Correspondingly, the first access network device receives the AI data from the terminal device.

Optionally, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication. In this way, reporting of the AI data can be completed without affecting the normal communication, to ensure reliability and efficiency of the communication function.

In a possible design method, that the terminal device sends the AI data to the first access network device in S304 may include the following step 9 to step 11:

Step 9: The AI protocol layer of the terminal device encapsulates the AI data into a second AI PDU.

Figure 10:
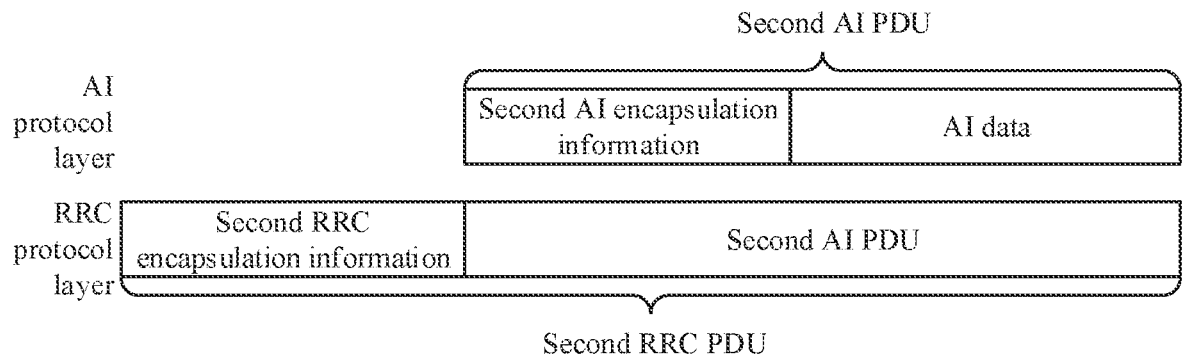
FIG. 10 is a schematic diagram 2 of a structure of a PDU according to an embodiment of this application.

For example, FIG. 10 is a schematic diagram 2 of a structure of a PDU according to an embodiment of this application. With reference to FIG. 4, as shown in FIG. 10, the AI protocol layer of the terminal device may add second AI encapsulation information to the AI data, to generate the second AI PDU.

Step 10: The AI protocol layer of the terminal device sends the second AI PDU to the RRC protocol layer of the terminal device. Correspondingly, the RRC protocol layer of the terminal device receives the second AI PDU from the AI protocol layer of the terminal device.

For example, the AI protocol layer of the terminal device may send the second AI PDU to the RRC protocol layer of the terminal device through an interface between the AI protocol layer of the terminal device and the RRC protocol layer of the terminal device.

Step 11: The RRC protocol layer of the terminal device adds second RRC encapsulation information to the second AI PDU, and sends the second AI PDU.

Specifically, with reference to FIG. 4, as shown in FIG. 10, the RRC protocol layer of the terminal device may add the second RRC encapsulation information to the second AI PDU, to generate a second RRC PDU, and then send the second RRC PDU by using an RRC message.

For specific implementations of step 9 to step 11, refer to the implementations of step 3 to step 5. Details are not described herein again.

In another possible design method, that the terminal device sends the AI data to the first access network device in S304 may include the following step 7 to step 9:

Step 7: The AI protocol layer of the terminal device encapsulates the AI data into a fourth AI PDU.

Figure 18:
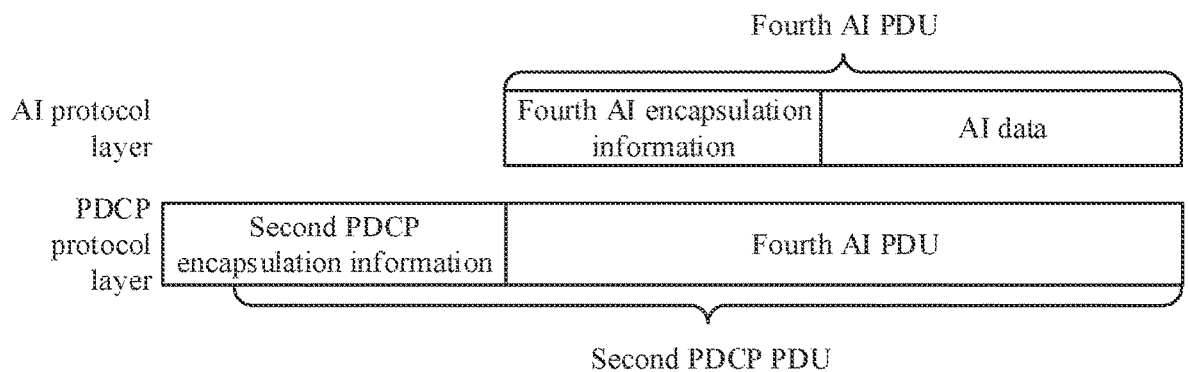
FIG. 18 is a schematic diagram 4 of a structure of a PDU according to an embodiment of this application.

For example, FIG. 18 is a schematic diagram 4 of a structure of a PDU according to an embodiment of this application. With reference to FIG. 11, as shown in FIG. 18, the AI protocol layer of the terminal device may add fourth AI encapsulation information to the AI data, to generate the fourth AI PDU.

Step 8: The AI protocol layer of the terminal device sends the fourth AI PDU to the PDCP protocol layer of the terminal device. Correspondingly, the PDCP protocol layer of the terminal device receives the fourth AI PDU from the AI protocol layer of the terminal device. A PDCP entity corresponding to the AI bearer at the PDCP protocol layer receives the fourth AI PDU.

For example, the AI protocol layer of the terminal device may send the fourth AI PDU to the PDCP protocol layer of the terminal device through an interface between the AI protocol layer of the terminal device and the PDCP protocol layer of the terminal device.

Step 9: The PDCP protocol layer of the terminal device adds second PDCP encapsulation information to the fourth AI PDU, and sends the fourth AI PDU.

Specifically, with reference to FIG. 11, as shown in FIG. 18, the PDCP protocol layer of the terminal device may add the second PDCP encapsulation information to the fourth AI PDU, to generate a second PDCP PDU, and then send the second PDCP PDU by using a PDCP message.

For specific implementations of step 7 to step 9, refer to the implementations of step 1 to step 3. Details are not described herein again.

It can be learned from step 9 to step 11 or step 7 to step 9 that, in this embodiment of this application, the AI protocol layer of the terminal device can be separated from an existing protocol layer of the terminal device, and the AI function can be further separated from the communication function, so that flexibility of the AI function supported by the terminal device can be improved. In addition, a protocol layer used for the communication function does not need to perform an AI-related operation, so that impact of the AI function on the communication function can be reduced, and technical complexity of the terminal device can be reduced, to reduce costs of the terminal device.

In a possible design method, before that the terminal device sends the AI data to the first access network device in S304, the communication method shown in FIG. 3 may further include: The first access network device sends a second request message to the terminal device. Correspondingly, the terminal device receives the second request message from the first access network device.

The second request message is used to request the terminal device to report the AI data. To be specific, the terminal device may report a specified type of AI data and a specified quantity of AI data at reporting time configured by the first access network device, so that peak hours of the normal communication can be avoided to ensure reliability of the normal communication, and reporting of redundant AI data can be avoided to further improve accuracy and efficiency of the AI training.

Optionally, the first access network device may deliver the second request message to the terminal device together with the AI parameter. For example, the first access network device may send the second request message and the AI parameter by using a same piece of RRC signaling or a same piece of AI signaling, or may separately send the second request message and the AI parameter to the terminal device. For example, the first access network device may send the second request message and the AI parameter by using two pieces of RRC signaling or two pieces of AI signaling. This is not specifically limited in this embodiment of this application.

It should be understood that the terminal device may alternatively determine a reporting occasion of the AI data by itself, for example, periodically report the AI data. Alternatively, the terminal device may report the AI data when a network trigger event occurs. The network trigger event may be dynamically configured or preconfigured by the first access network device. This is not specifically limited in this embodiment of this application.

Optionally, the AI protocol layer of the terminal device may alternatively be an upper layer of a non-access stratum (NAS) protocol layer of the terminal device. Correspondingly, the AI protocol layer is further used for AI function interaction between the terminal device and the core network element, for example, an AMF network element or an AIF network element.

Figure 19:
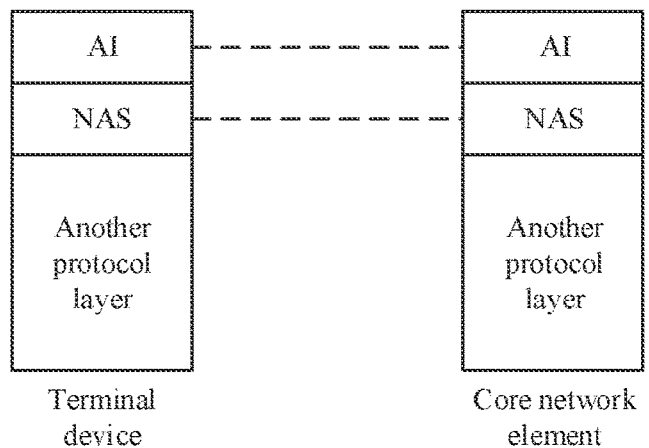
FIG. 19 is a diagram 4 of a protocol architecture according to an embodiment of this application.

For example, FIG. 19 is a diagram 4 of a protocol architecture according to an embodiment of this application. The terminal device may be any terminal device shown in FIG. 1, and the core network element may be the core network element shown in FIG. 1. There is interaction at a NAS protocol layer and/or interaction at an AI protocol layer between the terminal device and the core network element. As shown in FIG. 19, from top to bottom, the core network element and the terminal device each include the AI protocol layer, the NAS protocol layer, and another protocol layer. In other words, the AI protocol layer of the core network element is an upper layer of the NAS protocol layer of the core network element. Correspondingly, the AI protocol layer of the terminal device is an upper layer of the NAS protocol layer of the terminal device. For the another protocol layer other than the AI protocol layer and the NAS protocol layer, refer to an existing implementation. Details are not described in this embodiment of this application.

In a possible design method, for the terminal device, an AI protocol layer used for interaction with the first access network device and an AI protocol layer used for interaction with the core network element may be a same AI protocol layer. For example, the AI protocol layer is an upper layer of the RRC protocol layer, and an AI PDU of the AI protocol layer may be directly sent to the RRC protocol layer, to interact with the first access network device. The AI protocol layer is also an upper layer of the NAS protocol layer, and an AI PDU of the AI protocol layer may be directly sent to the NAS protocol layer, to interact with the core network element. For another example, the AI protocol layer is an upper layer of the PDCP protocol layer, and an AI PDU of the AI protocol layer may be directly sent to the PDCP protocol layer, to interact with the first access network device. The AI protocol layer is also an upper layer of the NAS protocol layer, and an AI PDU of the AI protocol layer may be directly sent to the NAS protocol layer, to interact with the core network element. In other words, for the terminal device, an AI function corresponding to an access network and an AI function corresponding to the core network element are implemented at the same AI protocol layer.

In another possible design method, the terminal device may alternatively have two AI protocol layers. One AI protocol layer may send an AI PDU to the NAS protocol layer, to interact with the core network element. The other AI protocol layer may send the AI PDU to the RRC protocol layer or the PDCP protocol layer, to interact with the access network device.

In a process of performing S301 to S304, if the terminal device needs to be handed over from the first access network device to a second access network device, the communication method shown in FIG. 3 may further include. The first access network device sends a handover request message to the second access network device. Correspondingly, the second access network device receives the handover request message from the first access network device.

The handover request message may carry second indication information, and the second indication information is used to indicate whether the second access network device is allowed to obtain the AI data of the terminal device. The second indication information may include the first indication information. In this way, the second access network device does not need to obtain the second indication information from the core network element, so that a quantity of times of signaling interworking can be reduced, to save signaling resources, and further improve the efficiency of the AI training.

Based on the communication method shown in FIG. 3, an independent AI protocol layer is introduced above the RRC protocol layer or the PDCP protocol layer of the first access network device, so that a type of the AI function and a quantity of AI functions supported by the first access network device can be flexibly adjusted based on an actual requirement of the AI training, for example, a new AI function is introduced, or an original AI function is modified, deleted, or recombined, and the communication function of the first access network device can be separated from the AI function of the first access network device. For example, the AI functions such as generating the AI parameter, receiving and parsing the AI data reported by the terminal device, and completing a network optimization operation based on the AI data are completed by the AI protocol layer of the first access network device. However, an original protocol layer of the first access network device, for example, the RRC protocol layer, only needs to implement the communication function, and does not need to perform an AI function-related operation. In this way, a problem that the AI function is bound to an existing RRC protocol layer procedure because the AI function is completed through the existing RRC protocol layer procedure such as minimization of drive tests can be resolved, to improve diversity and flexibility of the AI function supported by the first access network device, and improve the accuracy and the efficiency of the AI training. In addition, the original protocol layer does not need to be modified, an existing protocol is not affected, and a technical difficulty in implementing the AI function is low, to effectively reduce device development costs and network deployment costs.

In addition, the AI parameter is determined based on the requirement of the AI training. Therefore, the AI data obtained based on the AI parameter can meet various actual requirements of the AI training on a data type, a quantity of data, a data source, and the like, and problems such as a limited type of the data, an insufficient quantity of the data, and a failure to select the data source that are caused by completing the AI function through the existing RRC protocol layer procedure can be resolved, to further improve the accuracy and the efficiency of the AI training.

The foregoing describes in detail the communication method provided in embodiments of this application with reference to FIG. 3 to FIG. 19. The following describes in detail two other communication apparatuses provided in embodiments of this application with reference to FIG. 20 and FIG. 21.

Figure 20:
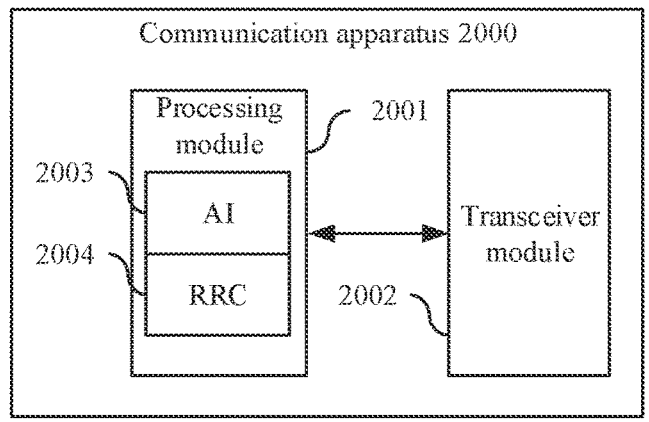
FIG. 20 is a schematic diagram 2 of a structure of a communication apparatus according to an embodiment of this application.

For example, FIG. 20 is a schematic diagram 2 of a structure of a communication apparatus according to an embodiment of this application. As shown in FIG. 20, the communication apparatus 2000 includes a processing module 2001 and a transceiver module 2002. The processing module 2001 includes an artificial intelligence (AI) protocol layer 2003 and a radio link control (RRC) protocol layer 2004 of the communication apparatus 2000. The AI protocol layer 2003 of the communication apparatus 2000 is an upper layer of the RRC protocol layer 2004 of the communication apparatus 2000. For ease of description, FIG. 20 shows only main components of the communication apparatus 2000.

In a possible design solution, the communication apparatus 2000 shown in FIG. 20 is applicable to the communication system shown in FIG. 1, and performs a function of the access network device in the communication method shown in FIG. 3.

The AI protocol layer 2003 of the communication apparatus 2000 is configured to generate an AI parameter.

The transceiver module 2002 is configured to send the AI parameter to a terminal device. The AI parameter is used to indicate AI data that needs to be obtained and an AI data obtaining manner.

The transceiver module 2002 is further configured to receive the AI data from the terminal device.

In a possible design, the AI protocol layer 2003 of the communication apparatus 2000 is further configured to encapsulate the AI parameter into a first AI protocol data unit (AI PDU). The AI protocol layer 2003 of the communication apparatus 2000 is further configured to send the first AI PDU to the RRC protocol layer 2004 of the communication apparatus 2000.

In a possible design, the AI parameter may include a first AI parameter. The first AI parameter is sent by using a broadcast AI system information block (AI SIB).

Further, the AI parameter may further include a second AI parameter. The second AI parameter may be sent by using RRC dedicated signaling, and a priority of the second AI parameter is higher than a priority of the first AI parameter.

Optionally, the RRC dedicated signaling may be sent on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the AI protocol layer 2003 of the communication apparatus 2000 is further configured to determine the second AI parameter based on AI capability information of the terminal device.

Correspondingly, the transceiver module 2002 is further configured to send a first request message to the terminal device. The first request message is used to request the AI capability information of the terminal device. The transceiver module 2002 is further configured to receive a first response message from the terminal device. The first response message includes the AI capability information of the terminal device.

It should be understood that the AI capability information of the terminal device may alternatively be obtained in another manner, for example, may be obtained from an OAM device or a core network element. This is not specifically limited in this embodiment of this application.

For example, the AI parameter may be a network slice-level parameter, a parameter based on a type of the terminal device, or a parameter based on a service type.

For example, the communication apparatus 2000 may include a radio access network intelligent controller (RIC) and a centralized unit (CU). The AI protocol layer 2003 of the communication apparatus 2000 is located in the RIC, and the RRC protocol layer 2004 of the communication apparatus 2000 is located in the CU.

It should be understood that the communication apparatus 2000 may alternatively use another physical architecture. For example, the communication apparatus 2000 includes a CU and a DU, and the AI layer of the communication apparatus 2000 is located in the CU; or the communication apparatus 2000 is not divided into a CU and a DU, that is, both the AI layer and an original protocol layer of the communication apparatus 2000 are located in a same entity device. A specific implementation of the communication apparatus 2000 is not limited in this embodiment of this application.

In a possible design, the transceiver module 2002 is further configured to: before the transceiver module 2002 receives the AI data from the terminal device, receive first indication information from the core network element. The first indication information is used to indicate that the core network element allows the communication apparatus 2000 to obtain the AI data of the terminal device.

Optionally, the transceiver module 2002 is further configured to send a handover request message to a second access network device. The handover request message carries second indication information. The second indication information is used to indicate whether the second access network device is allowed to obtain the AI data of the terminal device.

In a possible design, the transceiver module 2002 is further configured to: before the transceiver module 2002 receives the AI data from the terminal device, send a second request message to the terminal device. The second request message is used to request the terminal device to report the AI data.

Optionally, the communication apparatus 2000 may further include a storage module (not shown in FIG. 20), and the storage module stores a program or instructions. When the processing module 2001 executes the program or the instructions, the communication apparatus 2000 is enabled to perform the function of the first access network device in the communication method shown in FIG. 3.

It should be noted that the communication apparatus 2000 may be the access network device, or may be a chip or a chip system disposed in the access network device. This is not limited in this application.

In addition, for technical effects of the communication apparatus 2000, refer to technical effects of the communication method shown in FIG. 3. Details are not described herein again.

In another possible design solution, the communication apparatus 2000 shown in FIG. 20 is applicable to the communication system shown in FIG. 1, and performs a function of the terminal device in the communication method shown in FIG. 3.

The transceiver module 2002 is configured to receive an AI parameter from a first access network device. The AI parameter is used to indicate AI data that needs to be obtained and an AI data obtaining manner.

The AI protocol layer 2003 of the communication apparatus 2000 is configured to obtain the AI data based on the AI parameter.

The transceiver module 2002 is further configured to send the AI data to the first access network device.

In a possible design, the AI protocol layer 2003 of the communication apparatus 2000 is further configured to: after the AI protocol layer 2003 of the communication apparatus 2000 obtains the AI data based on the AI parameter, encapsulate the AI data into a second AI protocol data unit (AI PDU). The AI protocol layer 2003 of the communication apparatus 2000 is further configured to send the second AI PDU to the RRC protocol layer 2004 of the communication apparatus 2000.

In a possible design, the AI parameter may include a first AI parameter. The first AI parameter is received by using a broadcast AI system information block (AI SIB).

Further, the AI parameter may further include a second AI parameter. The second AI parameter may be received by using RRC dedicated signaling, and a priority of the second AI parameter is higher than a priority of the first AI parameter.

Optionally, the RRC dedicated signaling is received on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the second AI parameter may be determined based on AI capability information of the communication apparatus 2000.

Correspondingly, the transceiver module 2002 is further configured to receive a first request message from the first access network device. The first request message is used to request the AI capability information of the communication apparatus 2000. The transceiver module 2002 is further configured to send a first response message to the first access network device. The first response message includes the AI capability information of the communication apparatus 2000.

For example, the AI parameter may be a network slice-level parameter, a parameter based on a type of the terminal device, or a parameter based on a service type.

Optionally, the AI protocol layer 2003 may be an upper layer of a non-access stratum (NAS) protocol layer of the communication apparatus 2000, and the AI protocol layer 2003 of the communication apparatus 2000 is further used for AI function interaction between the communication apparatus 2000 and a core network.

In a possible design, the transceiver module 2002 is further configured to: before the transceiver module 2002 sends the AI data to the first access network device, receive a second request message from the first access network device. The second request message is used to request the communication apparatus 2000 to report the AI data.

It should be noted that the communication apparatus 2000 may alternatively determine a reporting occasion and reporting content of the AI data by itself, for example, periodically report the AI data. Alternatively, the communication apparatus 2000 may trigger reporting of the AI data when a network trigger event occurs. The network trigger event may be dynamically configured or preconfigured by the first access network device. This is not specifically limited in this embodiment of this application.

Optionally, the communication apparatus 2000 may further include a storage module (not shown in FIG. 20), and the storage module stores a program or instructions. When the processing module 2001 executes the program or the instructions, the communication apparatus 2000 is enabled to perform the function of the terminal device in the communication method shown in FIG. 3.

It should be noted that the communication apparatus 2000 may be the terminal device, or may be a chip or a chip system disposed in the terminal device. This is not limited in this application.

In addition, for technical effects of the communication apparatus 2000, refer to technical effects of the communication method shown in FIG. 3. Details are not described herein again.

Figure 21:
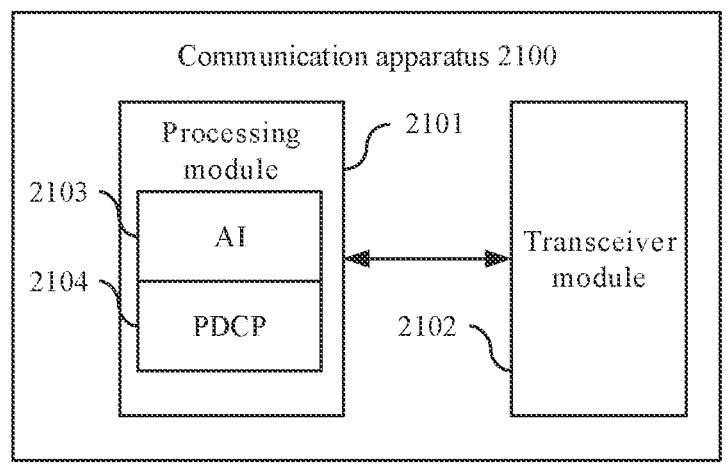
FIG. 21 is a schematic diagram 3 of a structure of a communication apparatus according to an embodiment of this application.

For example, FIG. 21 is a schematic diagram 3 of a structure of a communication apparatus according to an embodiment of this application. As shown in FIG. 21, the communication apparatus 2100 includes a processing module 2101 and a transceiver module 2102. The processing module 2101 includes an artificial intelligence (AI) protocol layer 2103 and a PDCP protocol layer 2104 of the communication apparatus 2100. The AI protocol layer 2103 of the communication apparatus 2100 is an upper layer of the PDCP protocol layer 2104 of the communication apparatus 2100. For ease of description. FIG. 21 shows only main components of the communication apparatus 2100.

In a possible design solution, the communication apparatus 2100 shown in FIG. 21 is applicable to the communication system shown in FIG. 1, and performs a function of the access network device in the communication method shown in FIG. 3.

The AI protocol layer 2103 of the communication apparatus 2100 is configured to generate an AI parameter.

The transceiver module 2102 is configured to send the AI parameter to a terminal device. The AI parameter is used to indicate AI data that needs to be obtained and an AI data obtaining manner.

The transceiver module 2102 is further configured to receive the AI data from the terminal device.

In a possible design, the AI protocol layer 2103 of the communication apparatus 2100 is further configured to encapsulate the AI parameter into a third AI protocol data unit (AI PDU). The AI protocol layer 2103 of the communication apparatus 2100 is further configured to send the third AI PDU to the PDCP protocol layer 2104 of the communication apparatus 2100.

In a possible design, the AI parameter may include a first AI parameter or a second AI parameter. Both the first AI parameter and the second AI parameter may be sent by using AI dedicated signaling, and a priority of the second AI parameter is higher than a priority of the first AI parameter.

Optionally, the AI dedicated signaling may be sent on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the AI protocol layer 2103 of the communication apparatus 2100 is further configured to determine the second AI parameter based on AI capability information of the terminal device.

Correspondingly, the transceiver module 2102 is further configured to send a first request message to the terminal device. The first request message is used to request the AI capability information of the terminal device. The transceiver module 2102 is further configured to receive a first response message from the terminal device. The first response message includes the AI capability information of the terminal device.

It should be understood that the AI capability information of the terminal device may alternatively be obtained in another manner, for example, may be obtained from an OAM device or a core network element. This is not specifically limited in this embodiment of this application.

For example, the AI parameter may be a network slice-level parameter, a parameter based on a type of the terminal device, or a parameter based on a service type.

For example, the communication apparatus 2100 may include a radio access network intelligent controller (RIC) and a centralized unit (CU). The AI protocol layer 2103 of the communication apparatus 2100 is located in the RIC, and the PDCP protocol layer 2104 of the communication apparatus 2100 is located in the CU.

It should be understood that the communication apparatus 2100 may alternatively use another physical architecture. For example, the communication apparatus 2100 includes a CU and a DU, and the AI layer of the communication apparatus 2100 is located in the CU; or the communication apparatus 2100 is not divided into a CU and a DU, that is, both the AI layer and an original protocol layer of the communication apparatus 2100 are located in a same entity device. A specific implementation of the communication apparatus 2100 is not limited in this embodiment of this application.

In a possible design, the transceiver module 2102 is further configured to: before the transceiver module 2102 receives the AI data from the terminal device, receive first indication information from the core network element. The first indication information is used to indicate that the core network element allows the communication apparatus 2100 to obtain the AI data of the terminal device.

Optionally, the transceiver module 2102 is further configured to send a handover request message to a second access network device. The handover request message carries second indication information. The second indication information is used to indicate whether the second access network device is allowed to obtain the AI data of the terminal device.

In a possible design, the transceiver module 2102 is further configured to: before the transceiver module 2102 receives the AI data from the terminal device, send a second request message to the terminal device. The second request message is used to request the terminal device to report the AI data.

Optionally, the communication apparatus 2100 may further include a storage module (not shown in FIG. 21), and the storage module stores a program or instructions. When the processing module 2101 executes the program or the instructions, the communication apparatus 2100 is enabled to perform the function of the first access network device in the communication method shown in FIG. 3.

It should be noted that the communication apparatus 2100 may be the access network device, or may be a chip or a chip system disposed in the access network device. This is not limited in this application.

In addition, for technical effects of the communication apparatus 2100, refer to technical effects of the communication method shown in FIG. 3. Details are not described herein again.

In another possible design solution, the communication apparatus 2100 shown in FIG. 21 is applicable to the communication system shown in FIG. 1, and performs a function of the terminal device in the communication method shown in FIG. 3.

The transceiver module 2102 is configured to receive an AI parameter from a first access network device. The AI parameter is used to indicate AI data that needs to be obtained and an AI data obtaining manner.

The AI protocol layer 2103 of the communication apparatus 2100 is configured to obtain the AI data based on the AI parameter.

The transceiver module 2102 is further configured to send the AI data to the first access network device.

In a possible design, the AI protocol layer 2103 of the communication apparatus 2100 is further configured to: after the AI protocol layer 2103 of the communication apparatus 2100 obtains the AI data based on the AI parameter, encapsulate the AI data into a fourth AI protocol data unit (AI PDU). The AI protocol layer 2103 of the communication apparatus 2100 is further configured to send the fourth AI PDU to the PDCP protocol layer 2104 of the communication apparatus 2100.

In a possible design, the AI parameter may include a first AI parameter or a second AI parameter. Both the first AI parameter and the second AI parameter may be received by using AI dedicated signaling, and a priority of the second AI parameter is higher than a priority of the first AI parameter.

Optionally, the AI dedicated signaling may be received on an AI radio bearer (AI RB). A priority of the AI RB is lower than priorities/a priority of a signaling radio bearer (SRB) 1 and/or an SRB 2.

Similarly, the AI data may also be sent on the AI radio bearer (AI RB). The priority of the AI RB is lower than the priorities/priority of the signaling radio bearer (SRB) 1 and/or the SRB 2 used for normal communication. Further, a priority of the AI data may be lower than a priority of a DRB used for normal communication.

Further, the second AI parameter may be determined based on AI capability information of the communication apparatus 2100.

Correspondingly, the transceiver module 2102 is further configured to receive a first request message from the first access network device. The first request message is used to request the AI capability information of the communication apparatus 2100. The transceiver module 2102 is further configured to send a first response message to the first access network device. The first response message includes the AI capability information of the communication apparatus 2100.

For example, the AI parameter may be a network slice-level parameter, a parameter based on a type of the terminal device, or a parameter based on a service type.

Optionally, the AI protocol layer 2103 may be an upper layer of a non-access stratum (NAS) protocol layer of the communication apparatus 2100, and the AI protocol layer 2103 of the communication apparatus 2100 is further used for AI function interaction between the communication apparatus 2100 and a core network.

In a possible design, the transceiver module 2102 is further configured to: before the transceiver module 2102 sends the AI data to the first access network device, receive a second request message from the first access network device. The second request message is used to request the communication apparatus 2100 to report the AI data.

It should be noted that the communication apparatus 2100 may alternatively determine a reporting occasion and reporting content of the AI data by itself, for example, periodically report the AI data. Alternatively, the communication apparatus 2100 may trigger reporting of the AI data when a network trigger event occurs. The network trigger event may be dynamically configured or preconfigured by the first access network device. This is not specifically limited in this embodiment of this application.

Optionally, the communication apparatus 2100 may further include a storage module (not shown in FIG. 21), and the storage module stores a program or instructions. When the processing module 2101 executes the program or the instructions, the communication apparatus 2100 is enabled to perform the function of the terminal device in the communication method shown in FIG. 3.

It should be noted that the communication apparatus 2100 may be the terminal device, or may be a chip or a chip system disposed in the terminal device. This is not limited in this application.

In addition, for technical effects of the communication apparatus 2100, refer to technical effects of the communication method shown in FIG. 3. Details are not described herein again.

An embodiment of this application provides a chip system. The chip system includes a processor and an input/output port. The processor is configured to implement a processing function in the foregoing method embodiments, and the input/output port is configured to implement a transceiver function in the foregoing method embodiments.

In a possible design, the chip system further includes a memory. The memory is configured to store program instructions and data for implementing the functions in the foregoing method embodiments.

The chip system may include a chip, or may include a chip and another discrete component.

An embodiment of this application provides a communication system. The system includes the foregoing one or more terminal devices and one or more network devices.

An embodiment of this application provides a computer-readable storage medium. The computer-readable storage medium includes a computer program or instructions. When the computer program or the instructions are run on a computer, the computer is enabled to perform the communication method in the foregoing method embodiments.

An embodiment of this application provides a computer program product, including a computer program or instructions. When the computer program or the instructions are run on a computer, the computer is enabled to perform the communication method in the foregoing method embodiments.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example and not limitation, many forms of random access memory (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM).

All or some of the foregoing embodiments may be implemented by using software, hardware (for example, a circuit), firmware, or any combination thereof. When the software is used for implementation, all or some of the foregoing embodiments may be implemented in a form of a computer program product. The computer program product includes one or more computer instructions or computer programs. When the program instructions or the computer programs are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner.

The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually represents an "or" relationship between the associated objects, or may indicate an "and/or" relationship. A specific meaning depends on a context.

In this application, "at least one" refers to one or more, and "a plurality of" refers to two or more. "At least one of the following items (pieces)" or a similar expression thereof means any combination of these items, including any combination of singular items (pieces) or plural items (pieces). For example, at least one (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   generating, by an artificial intelligence (AI) protocol layer of a first access network device, an AI parameter, wherein the AI protocol layer of the first access network device is an upper layer of a radio resource control (RRC) protocol layer of the first access network device;
   sending, by the first access network device, the AI parameter to a terminal device, wherein the AI parameter indicates AI data that needs to be obtained and an AI data obtaining manner; and
   receiving, by the first access network device, the AI data from the terminal device.

2. The communication method according to claim 1, wherein, after the generating, by an artificial intelligence (AI) protocol layer of a first access network device, an AI parameter, the communication method further comprises:
   encapsulating, by the AI protocol layer of the first access network device, the AI parameter into a first AI protocol data unit (AI PDU); and
   sending, by the AI protocol layer of the first access network device, the first AI PDU to the RRC protocol layer of the first access network device.

3. The communication method according to claim 1, wherein the AI parameter comprises a first AI parameter, and the first AI parameter is sent by using a broadcast AI system information block (AI SIB).

4. The communication method according to claim 3, wherein the AI parameter further comprises a second AI parameter, the second AI parameter is sent by using RRC dedicated signaling, and a priority of the second AI parameter is relatively higher than a priority of the first AI parameter.

5. The communication method according to claim 4, wherein the second AI parameter is determined by the first access network device based on AI capability information of the terminal device.

6. The communication method according to claim 1, wherein the AI parameter is a network slice-level parameter, a parameter based on a type of the terminal device, or a parameter based on a service type.

7. The communication method according to claim 1, wherein the first access network device comprises a radio access network intelligent controller (RIC) and a centralized unit (CU), the AI protocol layer of the first access network device is located in the RIC, and the RRC protocol layer of the first access network device is located in the CU.

8. The communication method according to claim 1, wherein, before the receiving, by the first access network device, the AI data from the terminal device, the communication method further comprises:
   receiving, by the first access network device, first indication information from a core network element, wherein the first indication information indicates that the core network element allows the first access network device to obtain the AI data of the terminal device.

9. The communication method according to claim 1, wherein the communication method further comprises:
   sending, by the first access network device, a handover request message to a second access network device, wherein the handover request message carries second indication information, and the second indication information indicates whether the second access network device is allowed to obtain the AI data of the terminal device.

10. A communication apparatus, comprising:
    at least one processor, wherein the at least one processor comprises an artificial intelligence (AI) protocol layer and a radio resource control (RRC) protocol layer of the communication apparatus, and the AI protocol layer of the communication apparatus is an upper layer of the RRC protocol layer of the communication apparatus;
    a transceiver; and
    one or more memories coupled to the at least one processor and storing programming instructions for execution by the at least one processor to:
      generate, by the AI protocol layer of the communication apparatus, an AI parameter;
      send, by the transceiver, the AI parameter to a terminal device, wherein the AI parameter indicates AI data that needs to be obtained and an AI data obtaining manner; and
      receive, by the transceiver, the AI data from the terminal device.

11. The communication apparatus according to claim 10, wherein the programming instructions are for execution by the at least one processor to:
    encapsulate, by the AI protocol layer of the communication apparatus, the AI parameter into a first AI protocol data unit (AI PDU); and
    send, by the AI protocol layer of the communication apparatus, the first AI PDU to the RRC protocol layer of the communication apparatus.

12. The communication apparatus according to claim 10, wherein the AI parameter comprises a first AI parameter, and the first AI parameter is sent by using a broadcast AI system information block (AI SIB).

13. The communication apparatus according to claim 12, wherein the AI parameter further comprises a second AI parameter, the second AI parameter is sent by using RRC dedicated signaling, and a priority of the second AI parameter is relatively higher than a priority of the first AI parameter.

14. The communication apparatus according to claim 13, wherein the second AI parameter is determined by the AI protocol layer of the communication apparatus based on AI capability information of the terminal device.

15. The communication apparatus according to claim 10, wherein the AI parameter is a network slice-level parameter, a parameter based on a type of the terminal device, or a parameter based on a service type.

16. The communication apparatus according to claim 10, wherein the communication apparatus comprises a radio access network intelligent controller (RIC) and a centralized unit (CU), the AI protocol layer of the communication apparatus is located in the RIC, and the RRC protocol layer of the communication apparatus is located in the CU.

17. A communication apparatus, comprising:
    at least one processor, wherein the at least one processor comprises an artificial intelligence (AI) protocol layer and a radio resource control (RRC) protocol layer of the communication apparatus, and the AI protocol layer of the communication apparatus is an upper layer of the RRC protocol layer of the communication apparatus;
    a transceiver; and
    one or more memories coupled to the at least one processor and storing programming instructions for execution by the at least one processor to:
      receive, by the transceiver, an AI parameter from a first access network device, wherein the AI parameter indicates AI data that needs to be obtained and an AI data obtaining manner;
      obtain, by the AI protocol layer of the communication apparatus, the AI data based on the AI parameter; and
      send, by the transceiver, the AI data to the first access network device.

18. The communication apparatus according to claim 17, wherein the programming instructions are for execution by the at least one processor to:
    after the AI protocol layer of the communication apparatus obtains the AI data based on the AI parameter, encapsulate, by the AI protocol layer of the communication apparatus, the AI data into a second AI protocol data unit (AI PDU); and
    send, by the AI protocol layer of the communication apparatus, the second AI PDU to the RRC protocol layer of the communication apparatus.

19. The communication apparatus according to claim 17, wherein the AI parameter comprises a first AI parameter, and the first AI parameter is received by using a broadcast AI system information block (AI SIB).

20. The communication apparatus according to claim 19, wherein the AI parameter further comprises a second AI parameter, the second AI parameter is received by using RRC dedicated signaling, and a priority of the second AI parameter is relatively higher than a priority of the first AI parameter.

* * * * *

UNITED STATES PATENT AND TRADEMARK OFFICE
CERTIFICATE OF CORRECTION

PATENT NO. : 12,262,228 B2  
APPLICATION NO. : 17/848852  
DATED : March 25, 2025  
INVENTOR(S) : Hongping Zhang and Qinghai Zeng It is certified that error appears in the above-identified patent and that said Letters Patent is hereby corrected as shown below:

On the Title Page

In Column 1 Item (30) (Foreign Application Priority Data), In Line 1, Delete "(WO)" and insert -- (CN) --.

In the Claims

In Column 39, In Line 44 (Approx.), In Claim 10, delete "transceiver," and insert -- transceiver; --.

Signed and Sealed this  
Twenty-ninth Day of July, 2025

Coke Morgan Stewart  
*Acting Director of the United States Patent and Trademark Office*